United States Patent
Chau et al.

(10) Patent No.: US 8,855,010 B2
(45) Date of Patent: Oct. 7, 2014

(54) ASSIGNING GATEWAYS FOR HETEROGENEOUS WIRELESS MOBILE NETWORKS

(75) Inventors: Chi-Kin Chau, Singapore (SG); Kang-Won Lee, Nanuet, NY (US); Ho Yin Starsky Wong, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 13/112,569

(22) Filed: May 20, 2011

(65) Prior Publication Data

US 2012/0294187 A1    Nov. 22, 2012

(51) Int. Cl.
| | | |
|---|---|---|
| *H04W 40/24* | (2009.01) |
| *H04W 40/32* | (2009.01) |
| *H04W 84/18* | (2009.01) |
| *H04L 12/717* | (2013.01) |
| *H04L 12/721* | (2013.01) |
| *H04W 88/16* | (2009.01) |

(52) U.S. Cl.
CPC .............. *H04W 40/24* (2013.01); *H04W 40/32* (2013.01); *H04W 88/16* (2013.01); *H04L 45/42* (2013.01); *H04W 84/18* (2013.01); *H04L 45/70* (2013.01)
USPC ........... 370/254; 709/220; 709/221; 709/223; 709/224

(58) Field of Classification Search
CPC ... H04W 40/428; H04W 40/32; H04W 84/18; H04L 45/70; H04L 45/42; H04L 45/04; H04L 45/46
USPC .................. 370/254; 709/220, 221, 223, 224
See application file for complete search history.

(56) References Cited

U.S. PATENT DOCUMENTS

| | | | |
|---|---|---|---|
| 6,744,740 B2 * | 6/2004 | Chen ............................ | 370/255 |
| 6,980,524 B1 | 12/2005 | Lu et al. | |
| 2002/0181443 A1 | 12/2002 | Coffey et al. | |
| 2003/0096576 A1 * | 5/2003 | Salonidis et al. ............... | 455/41 |
| 2005/0169238 A1 | 8/2005 | Yang et al. | |

(Continued)

OTHER PUBLICATIONS

Baker, D.J.; Wieselthier, J.E.; Ephremides, Anthony; McGregor, D.N., "Distributed Network Reconfiguration in Response to Jamming at HF," Military Communications Conference—Progress in Spread Spectrum Communications, 1982. MILCOM 1982. IEEE , vol. 1, No., pp. 23.2-1,23.2-7, Oct. 17-20, 1982.*

(Continued)

*Primary Examiner* — Ayaz Sheikh
*Assistant Examiner* — Tarell Hampton
(74) *Attorney, Agent, or Firm* — Tutunjian & Bitetto, P.C.; Jennifer R. Davis

(57) ABSTRACT

Systems and methods are provided for assigning gateways for heterogeneous wireless mobile networks. A method includes exchanging routing and connectivity information between a plurality of nodes. Each node is respectively included in a corresponding one of a plurality of mobile ad hoc networks. The information excludes global positioning satellite information. The method further includes determining, for a given node, whether a particular set of gateway functionalities of the given node are redundant with respect to one or more other nodes, based on topology information derived from the information. The method also includes dynamically assigning the given node as a gateway or a non-gateway by respectively turning on or turning off the particular set of gateway functionalities of the given node when the particular set of gateway functionalities of the given node are respectively determined to be non-redundant or redundant with respect to the one or more other nodes.

23 Claims, 11 Drawing Sheets

(56) References Cited

U.S. PATENT DOCUMENTS

| | | | |
|---|---|---|---|
| 2006/0094426 A1 | 5/2006 | Donaho et al. | |
| 2007/0047510 A1* | 3/2007 | Cho et al. | 370/338 |
| 2008/0200168 A1 | 8/2008 | Jiang | |
| 2008/0253386 A1 | 10/2008 | Barum | |
| 2009/0141653 A1* | 6/2009 | McNeill et al. | 370/254 |
| 2009/0147702 A1* | 6/2009 | Buddhikot et al. | 370/255 |
| 2009/0219834 A1 | 9/2009 | Babbar et al. | |
| 2009/0238099 A1 | 9/2009 | Ahmavaara | |
| 2009/0285126 A1* | 11/2009 | Lu et al. | 370/255 |

OTHER PUBLICATIONS

Christian Frank and Kay Romer. 2005. Algorithms for generic role assignment in wireless sensor networks. In Proceedings of the 3rd international conference on Embedded networked sensor systems (SenSys '05). ACM, New York, NY, USA, 230-242. DOI=10.1145/1098918.1098944 http://doi.acm.org/10.1145/1098918.1098944.*

Baker, D.J.; Ephremides, Anthony, "The Architectural Organization of a Mobile Radio Network via a Distributed Algorithm," Communications, IEEE Transactions on , vol. 29, No. 11, pp. 1694,1701, Nov. 1981.*

Chau, C., et al. "Inter-Domain Routing for Mobile Ad Hoc Networks" MobiArch '08. Aug. 2008. pp. 61-66.

Chen, Y., et al. "Clustering Algorithms for Ad Hoc Wireless Networks" Ad Hoc and Sensor Networks. 2004. pp. 1-16.

Crowcroft, J., et al. "Plutarch: An Argument for Network Pluralism" ACM SIGCOMM 2003. Aug. 2003. (9 pages).

Ma, W., et al. "Comparisons of Inter-Domain Routing Schemes for Heterogeneous Ad Hoc Networks" 2005 International Conference on a World of Wireless, Mobile and Multimedia Networks (WOWMOM 2005). Jun. 2005. (10 pages).

Ramasubramanian, V., et al. "Sharp: A Hybrid Adaptive Routing Protocol for Mobile Ad Hoc Networks" MobiHoc '03. Jun. 2003. pp. 303-314.

Schmid, S., et al. "Turfnet: An Architecture for Dynamically Composable Networks" Proceedings of 1st IFIP International Workshop on Autonomic Communication (WAC 2004). Oct. 2004. (21 pages).

* cited by examiner

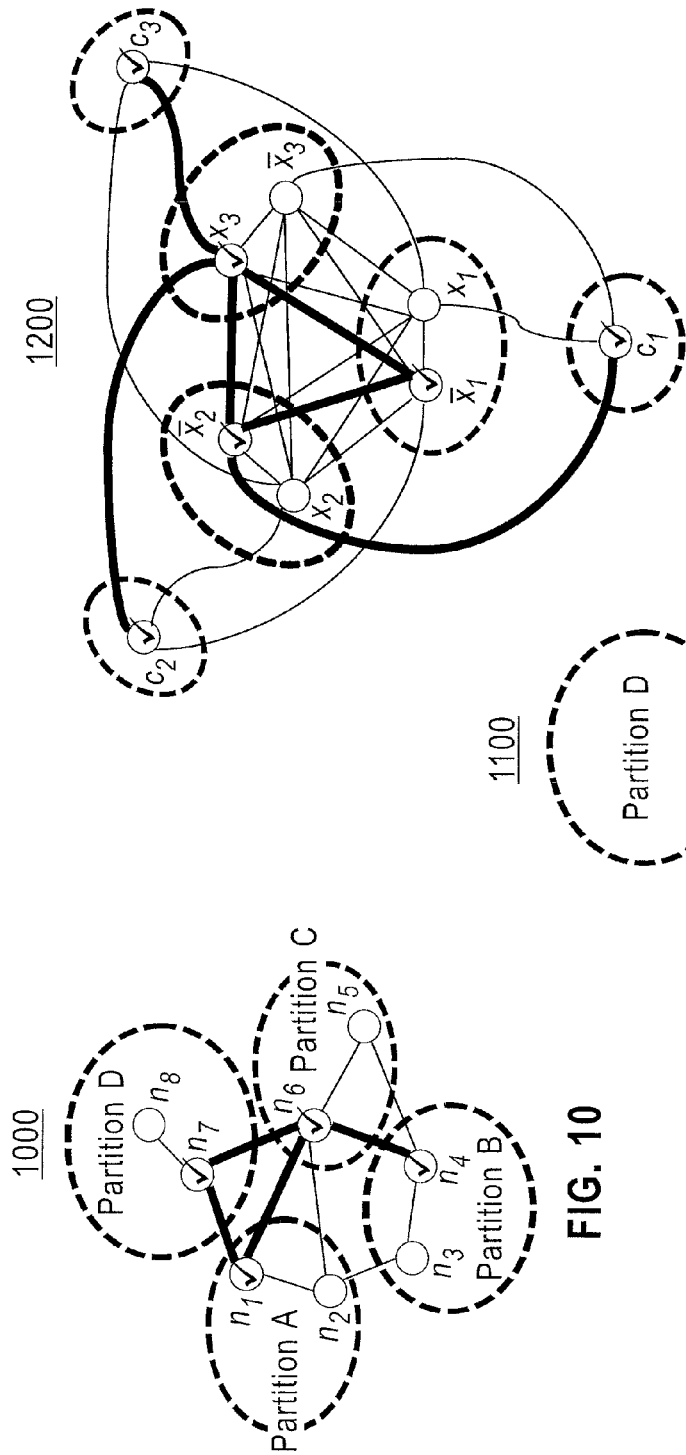

ASSIGNING GATEWAYS FOR HETEROGENEOUS WIRELESS MOBILE NETWORKS

GOVERNMENT RIGHTS

This invention was made with Government support under Contract No.: W911NF-06-3-0001 awarded by the U.S. Army. The Government has certain rights in this invention.

BACKGROUND

1. Technical Field

The present invention generally relates to mobile networks and, more particularly, to assigning gateways for heterogeneous wireless mobile networks.

2. Description of the Related Art

Inter-domain networking across mobile ad hoc networks is an important capability to enable practical applications, such as search and rescue operations by multi-agencies, disaster recovery efforts by multi-national organizations (such as the RED CROSS, the MEDECINS SANS FRONTIERES, law enforcement), and coalition military operations by multiple forces in a region with little infrastructure support. Inter-domain networking allows different organizations with potentially heterogeneous networking technologies to communicate with each other while preserving the organizational boundaries and their own networking policy. In recent years, the research community started to pay attention to this important yet relatively unexplored problem, and several proposals have been made to address technology gaps. The proposals involve the following: architecture and framework design; inter-domain routing and policy support; and deployment and control of helper nodes to connect multiple domains.

One of the key components to enable inter-domain networking (in both wired and wireless networks) is the gateway. Gateway nodes act as control points to collect and distribute inter-domain routing information, and also enforce inter-domain routing policy enacted by each domain. In addition, gateways play the important role of isolating the intra-domain routing mechanism of one domain from that of other domains. More importantly, in mobile ad hoc networks (MANETs), gateways may need to perform protocol translation since different domains may employ different routing schemes (e.g., reactive, proactive, geo-routing, and so forth). General issues in designing an inter-domain routing protocol in MANETs and building gateways have been presented.

Previous work assumed gateway functionalities are statically assigned to a subset of nodes. While this approach will work well in a static scenario (e.g., wireless mesh), it may be problematic in MANETs due to node mobility. FIGS. 1-4 show an example of network topology changes in MANETs. FIG. 1 shows the initial network topology 100 of a particular MANET. FIG. 2 shows the network topology 200 of the particular MANET after nodes in partition B have moved. FIG. 3 shows the network topology 300 of the particular MANET after a network partition (two nodes in Partition A moved away). FIG. 4 shows the network topology 400 of the particular MANET after regaining cross-partition connectivity. Returning to FIG. 1, there are two partitions, and each partition has a gateway through which the nodes in one partition can communicate with the nodes in the other partition. At some later time, the network topology has changed due to node mobility or wireless channel variation and, as a result, the inter-partition connectivity is lost (FIGS. 2 and 3). In general, any static gateway assignment is bound to suffer from such connectivity problem in dynamic MANETs.

SUMMARY

According to an aspect of the present principles, a method is provided. The method includes exchanging routing and connectivity information between a plurality of nodes. Each of the plurality of nodes is respectively included in a corresponding one of a plurality of mobile ad hoc networks. The routing and connectivity information excludes global positioning satellite information. The method further includes determining, for a given node from among the plurality of nodes, whether a particular set of gateway functionalities of the given node are redundant with respect to one or more other nodes from among the plurality of nodes, based on topology information derived from the routing and connectivity information. The method also includes dynamically assigning the given node as a gateway or a non-gateway by respectively turning on or turning off the particular set of gateway functionalities of the given node when the particular set of gateway functionalities of the given node are respectively determined to be non-redundant or redundant with respect to the one or more other nodes.

According to another aspect of the present principles, a system is provided. The system includes a first multi-domain mobile ad hoc network including a first set of nodes, and a second multi-domain mobile ad hoc network including a second set of nodes. The system further includes a centralized server having a dynamic gateway assigner configured to receive routing and connectivity information from a plurality of nodes formed from the first set of nodes and the second set of nodes, and to determine, for a given node from among the plurality of nodes, whether a particular set of gateway functionalities of the given node are redundant with respect to one or more other nodes from among the plurality of nodes, based on topology information derived from the routing and connectivity information. The given node is configured to dynamically assign itself as a gateway or a non-gateway by respectively turning on or turning off the particular set of gateway functionalities of the given node when the particular set of gateway functionalities of the given node are respectively determined to be non-redundant or redundant with respect to the one or more other nodes.

According to another aspect of the present principles, a computer readable storage medium comprising a computer readable program is provided. The computer readable program when executed on a computer causes the computer to perform the respective steps of the aforementioned method.

According to yet another aspect of the present principles, a method is provided. The method includes exchanging routing and connectivity information between a plurality of nodes. Each of the plurality of nodes is respectively included in a corresponding one of a plurality of mobile ad hoc networks. The routing and connectivity information excludes global positioning satellite information. The plurality of mobile ad hoc networks includes multiple intra-domains and multiple inter-domains. The method further includes deriving a real-time intra-domain topology of the multiple intra-domains and a real-time inter-domain topology of the multiple inter-domains from the routing and connectivity information. The method also includes determining, for a given node from among the plurality of nodes, whether a particular set of gateway functionalities of the given node are redundant with respect to one or more other nodes from among the plurality of nodes, based on the real-time intra-domain topology of the multiple intra-domains and the real-time inter-domain topology of the multiple inter-domains. The method additionally includes dynamically assigning the given node as a gateway or a non-gateway by respectively turning on or turning off the particular set of gateway functionalities of the given node when the particular set of gateway functionalities of the given node are respectively determined to be non-redundant or redundant with respect to the one or more other nodes.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 10 shows a topology 1000 of a mobile ad hoc network (MANET), according to an embodiment of the present principles;

FIG. 11 shows a partition-level graph 1100 for the MANET of FIG. 10, according to an embodiment of the present principles;

FIG. 12 shows an illustration of the construction 1200 of MGA($\mathcal{G}$, $\mathcal{P}$, $\Delta$) for a given formula F, according to an embodiment of the present principles;

DETAILED DESCRIPTION OF PREFERRED EMBODIMENTS

Figure 1:
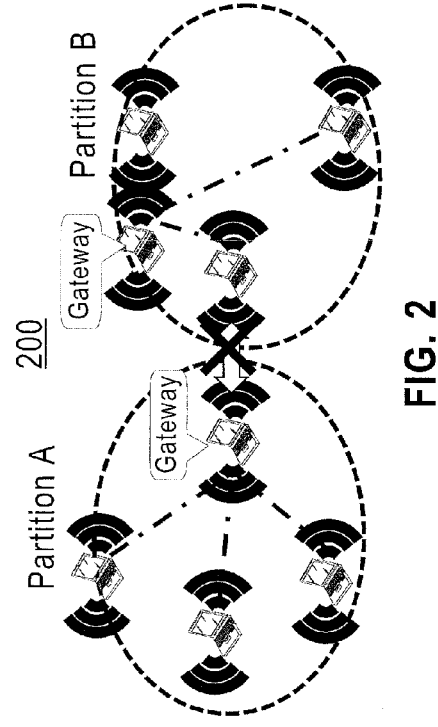
FIG. 1 is a diagram showing the initial network topology 100 of a particular MANET.
Figure 2:
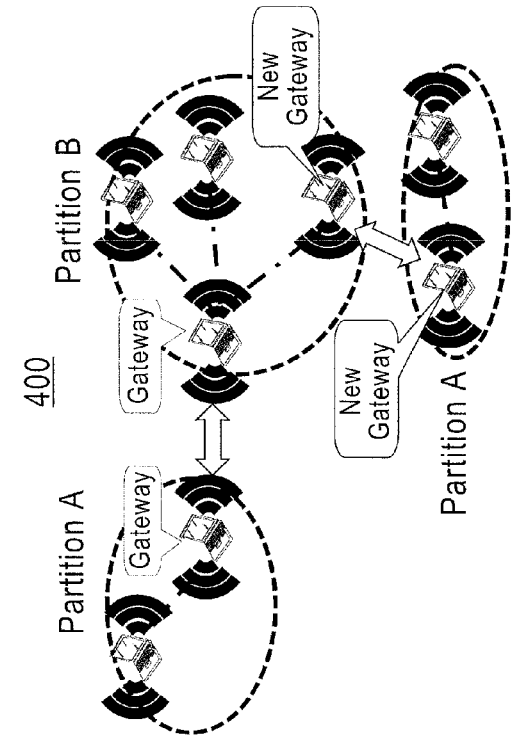
FIG. 2 is a diagram showing the network topology 200 of the particular MANET after nodes in partition B have moved.
Figure 3:
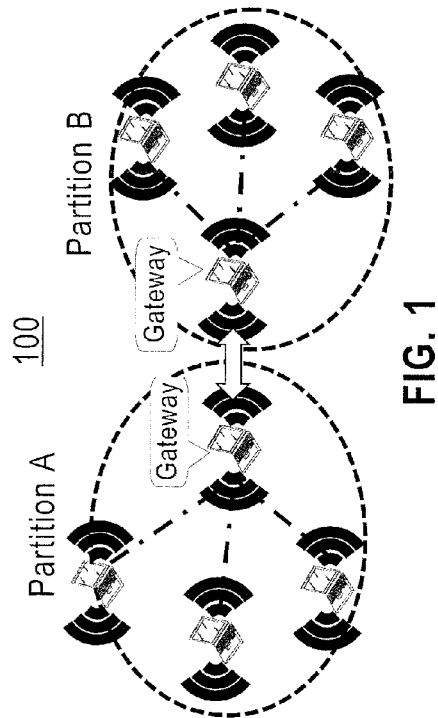
FIG. 3 is a diagram showing the network topology 300 of the particular MANET after a network partition (two nodes in Partition A moved away)
Figure 4:
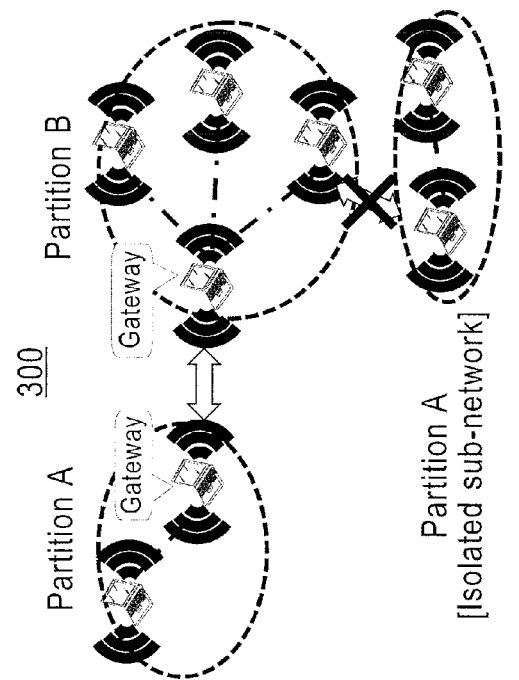
FIG. 4 is a diagram showing the network topology 400 of the particular MANET after regaining cross-partition connectivity.

As noted above, the present principles are directed to assigning gateways for heterogeneous wireless mobile networks.

In general, any static gateway assignment is bound to suffer from the above described connectivity problem in dynamic MANETs. At a high level, there are two options to overcome this problem as follows: (1) make all nodes as gateways so that every node can handle inter-partition traffic; and (2) dynamically assign the role of gateway to suitable nodes that can make inter-partition connections as topology changes. The first approach is not very attractive because gateway nodes typically consume more power for multi-protocol processing and will generate more control traffic for inter-domain route and policy update. Thus, the present principles are directed to the second option.

In particular, the present principles aim to provide distributed mechanisms to elect gateways adaptively and optimally. By optimal, we mean to elect a minimal number of nodes to become gateways while all network partitions (i.e., represented as sub-graphs) are connected. To solve this problem, we formulated a novel graph optimization problem which called Minimal Gateway Assignment Problem, and proved its NP-completeness. We then designed efficient algorithms to solve this problem. We first designed centralized algorithms assuming full topology information and show that it has a theoretical approximation bound. We then designed distributed algorithms with various degrees of assumptions on the level of cooperation between domains and the availability of full topology information, and prove the correctness of the proposed distributed algorithms.

In one or more embodiments, we assume that routing information is sent to an external computation unit through a separate control channel (e.g., 3G, WiMax, etc.), or a subset (or all) of the nodes in the network can obtain the entire network topology information. Then we can apply the centralized algorithm to compute gateway assignment. We provide two centralized mechanisms with different computation complexity and performance bound in terms of number of gateways.

(i) SimpCen: In each step a pair of inter-partition neighbors is put into gateway assignment when such assignment can improve the connectivity at the partition-level topology.

(ii) Cen: To improve the performance of SimpCen, a heuristic is used to check thoroughly to make sure that the selected nodes as gateways will always provide the largest decrease in the number of disjoint components with the smallest number of gateway assignments in each step.

Distributed Mechanisms

In this case, we do not assume global network topology knowledge. Nodes exchange routing information with their neighbors, and progressively propagate the information throughout the network. When the nodes receive the routing information, the nodes determine their roles in the network locally, and switch on/off their gateway functionalities.

We disclose three mechanisms, with different level of cooperation and shared information. Regarding the levels of cooperation, we provide two illustrative schemes of cooperation, namely a tightly cooperative scheme and a loosely cooperative scheme. In the "tightly cooperative" scheme, nodes in one domain can enforce the decisions of nodes in other domains in order to achieve a better decision. On the other hand, the loosely cooperative algorithm will only use the other domain decisions as reference. Regarding the level of shared information, we have two levels of shared information, namely full information and partial information. Full information means a node can make decisions only if it has the full topology information. Partial information means a node can make decisions even it only has partial information.

(i) DIS-Tight: Tightly Cooperative with Full Topology Information. At each step, a node is selected randomly (e.g., by using a back-off timer) to make a decision. The node will decide to activate its gateway functionality base on the current topology information. If the node decides to activate its gateway functionality, then its inter-partition neighbors will also activate their gateway functionality (ii) DIS-Loose: Loosely Cooperative with Full Topology Information. A node can decide if it wants to become an active gateway based on the number of gateways in its neighborhood. The idea behind this scheme is the following: if a node has a greater number of inter-partition neighbors, the chance to reduce the number of disconnected components in the partition-level graph will be higher if the node is a gateway. That is, for example, if a Node A has more neighbors than a Node B, then the chance that Node A can build a communication link with other gateways is higher than for Node B. Nodes do not enforce their inter-partition neighbors to activate their gateway functionality.

(iii) DIS-Local: Tightly Cooperative Algorithms with Partial Information. In some scenarios, the network can be a relatively large graph such that it may take a long time to propagate the assignment decision throughout the network. To address this issue, a node is allowed to make decisions even when the node has partial information. In an embodiment, nodes only collect information from their 1-hop neighboring partitions. Of course, other hop distances can also be used, while maintaining the spirit of the present principles.

TABLE 1 shows some common notations used herein.

TABLE I

| Notation | Description |
| --- | --- |
| G = (V, E) | The whole network topology of MANET |
| Comp(G) | The number of disjoint components in a graph G |
| D | The set of administrative domains |
| P | The set of network partitions, $|P| \_ |P|$ |
| P(n) | The partition node n belongs to |
| V(n) | The set of nodes in the same partition as n |
| N | A subset of nodes as a gateway assignment |
| Gdm[N] = (P, Ldm(P, N)) | The partition-level graph |
| Nbitd(n) | The set of inter-partition neighbors of node n |
| Nbita(n) | The set of intra-partition neighbors of node n |
| NGitd(n) | The set of inter-partition neighbors of node n that are also in gateway assignment N |
| NGita(n) | The set of intra-partition neighbors of node n that are also in gateway assignment N |

Moreover, as used herein, the word "domain" refers to a logical concept determined by the organization that the network nodes belong to, whereas "partition" is a physical concept determined by the connectivity. For example a single domain owned by the RED CROSS can be divided into multiple partitions. In this regard, it will be more precise to call our problem an inter-partition connectivity problem since a MANET domain can be partitioned into multiple sub-networks. However, we use "domain" and "partition" interchangeably when there is no ambiguity.

Inter-domain refers to items (e.g., topology, networking, interactions, information, etc.) that relate to different domains. Intra-domain refers to items (e.g., topology, networking, interactions, information, etc.) that relate to the same (single) domain. Multi-domain refers to having and/or otherwise involving more than one domain. Inter-partition neighbors refers to neighbors which do not belong to the domain having a node under current consideration with respect to assigning that node as a gateway. Real-time intra-domain topology refers to an essentially real-time representation of the topology of one or more intra-domains. Real-time inter-domain topology refers to an essentially real-time representation of the topology of one or more inter-domains.

Thus, the present principles provide multiple mechanisms to elect gateways dynamically and optimally. By dynamic, we mean to elect gateways according to runtime network topology that changes over time. By optimal, we mean to elect a minimal number of nodes to become gateways while all network partitions are connected. Multiple mechanisms with different level of coordination, cooperation and shared information are disclosed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
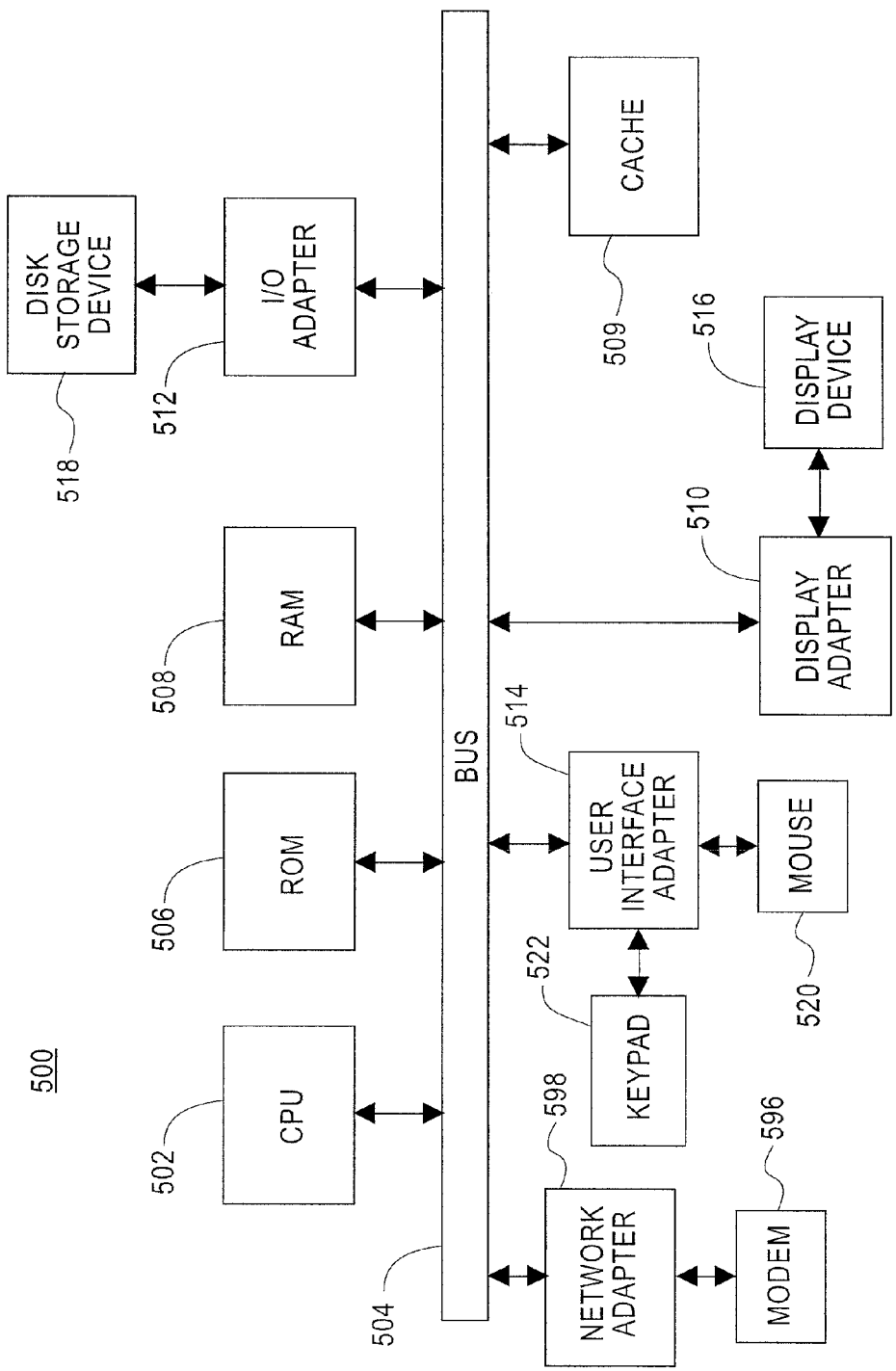
FIG. 5 is a block diagram showing an exemplary processing system 500 to which the present principles may be applied, according to an embodiment of the present principles.

FIG. 5 is a block diagram showing an exemplary processing system 500 to which the present principles may be applied, according to an embodiment of the present principles. The processing system 500 includes at least one processor (CPU) 502 operatively coupled to other components via a system bus 504. A read only memory (ROM) 506, a random access memory (RAM) 508, a display adapter 510, an I/O adapter 512, a user interface adapter 514, and a network adapter 598, are operatively coupled to the system bus 504.

A display device 516 is operatively coupled to system bus 504 by display adapter 510. A disk storage device (e.g., a magnetic or optical disk storage device) 518 is operatively coupled to system bus 504 by I/O adapter 512.

A mouse 520 and keyboard 522 are operatively coupled to system bus 504 by user interface adapter 514. The mouse 520 and keyboard 522 are used to input and output information to and from system 500.

A (digital and/or analog) modem 596 is operatively coupled to system bus 504 by network adapter 598.

Of course, the processing system 500 may also include other elements (not shown), including, but not limited to, a sound adapter and corresponding speaker(s), and so forth, as readily contemplated by one of skill in the art.

Figure 6:
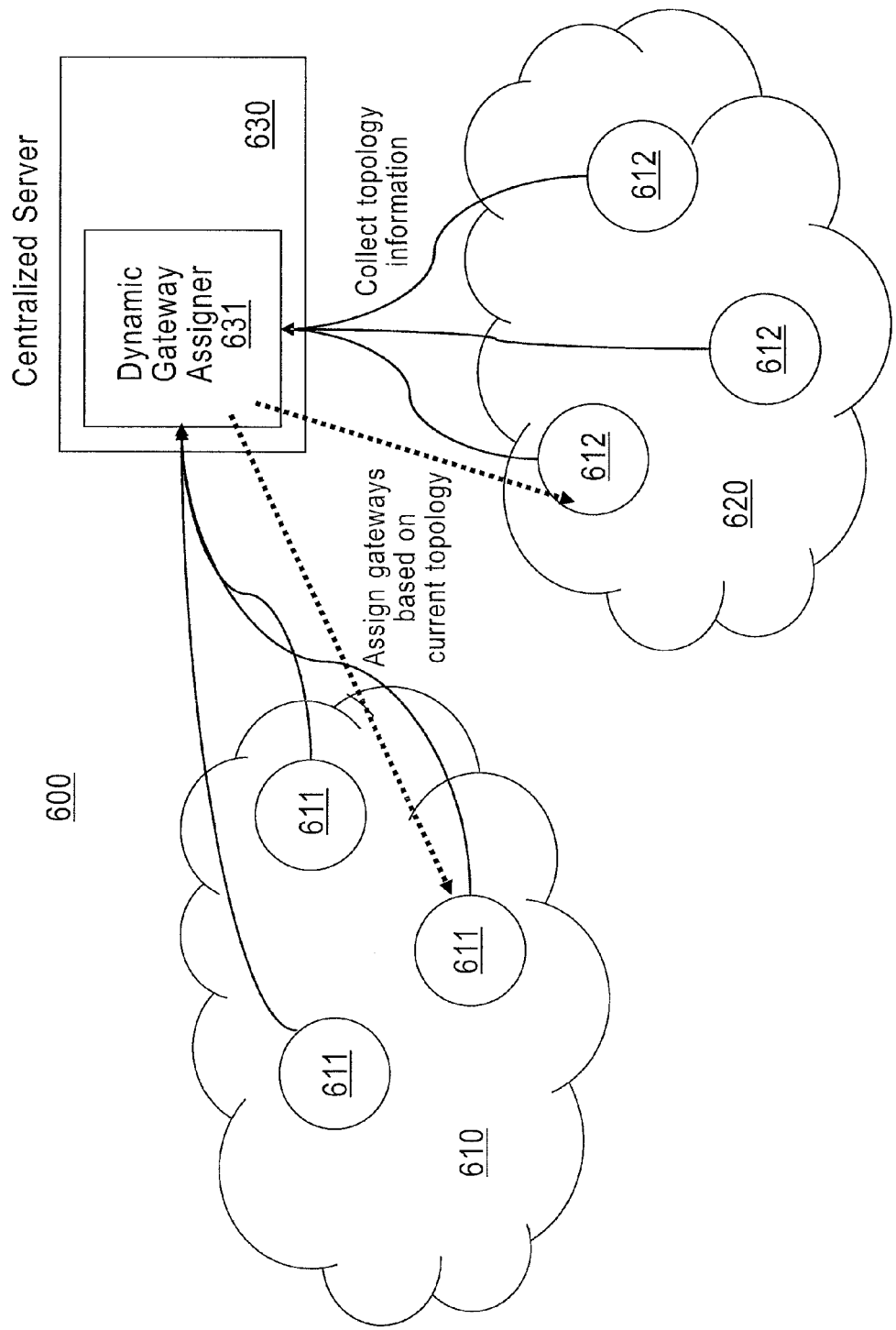
FIG. 6 is a block diagram showing an exemplary system 600 for assigning gateways for heterogeneous wireless mobile networks, according to an embodiment of the present principles.

FIG. 6 shows an exemplary system for assigning gateways for heterogeneous wireless mobile networks, according to an embodiment of the present principles. The system 600 is directed to a centralized embodiment of the present principles. The system 600 includes a first multi-domain mobile ad hoc network 610 having a first set of nodes 611, a second multi-domain mobile ad hoc network 620 having a second set of nodes 612, and a centralized server 630. The centralized server 630 includes a dynamic gateway assigner 631. In system 600, the dynamic gateway assigner in the centralized server 630 collects routing and connectivity information from the first set of nodes 611 and the second set of nodes 612, and determines whether or not to turn on or turn off the gateway functionalities of any given node in the sets based on whether such gateway functionalities are redundant with respect to other nodes in the sets. The functions of the elements of system 600 will be described in further detail hereinafter.

Figure 7:
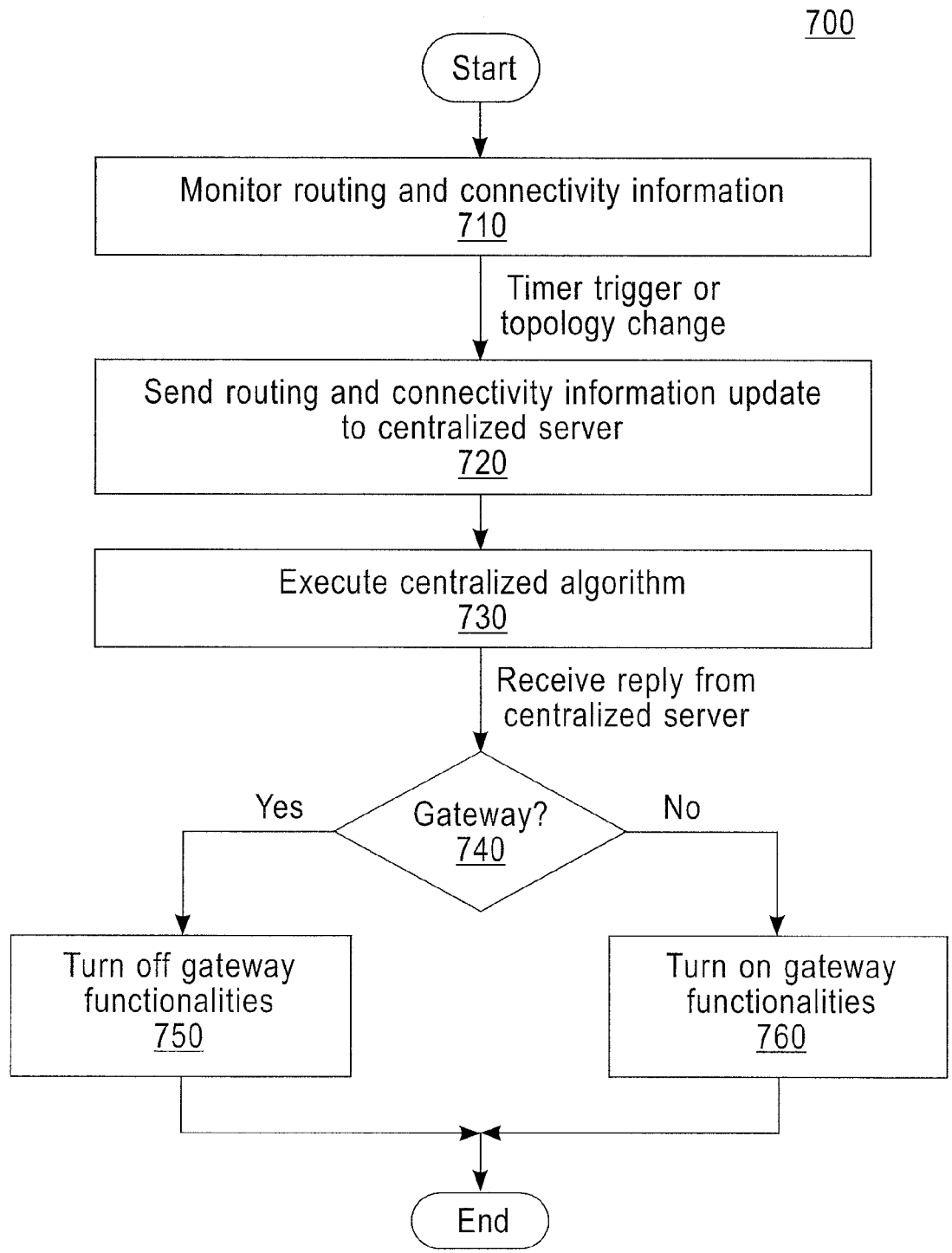
FIG. 7 is a flow diagram showing an exemplary method 700 for assigning gateways for heterogeneous wireless mobile networks, according to an embodiment of the present principles.

FIG. 7 shows an exemplary method 700 for assigning gateways for heterogeneous wireless mobile networks, according to an embodiment of the present principles. The method 700 is directed to a centralized embodiment of the present principles. At step 710, routing and connectivity information is monitored. At step 720, a routing and connectivity information update is sent to the centralized sever (responsive to a timer trigger or topology change detected by the route and connectivity monitoring per step 710). At step 730, the distributed algorithm is executed (responsive to the routing and connectivity information update). At step 740, it is determined (responsive to a received reply from the centralized server) whether or not the current node is a gateway. If so, then control is passed to a step 750. Otherwise, control is passed to a step 760. At step 750, the gateway functionalities are turned on. At step 760 the gateway functionalities are turned off.

Figure 8:
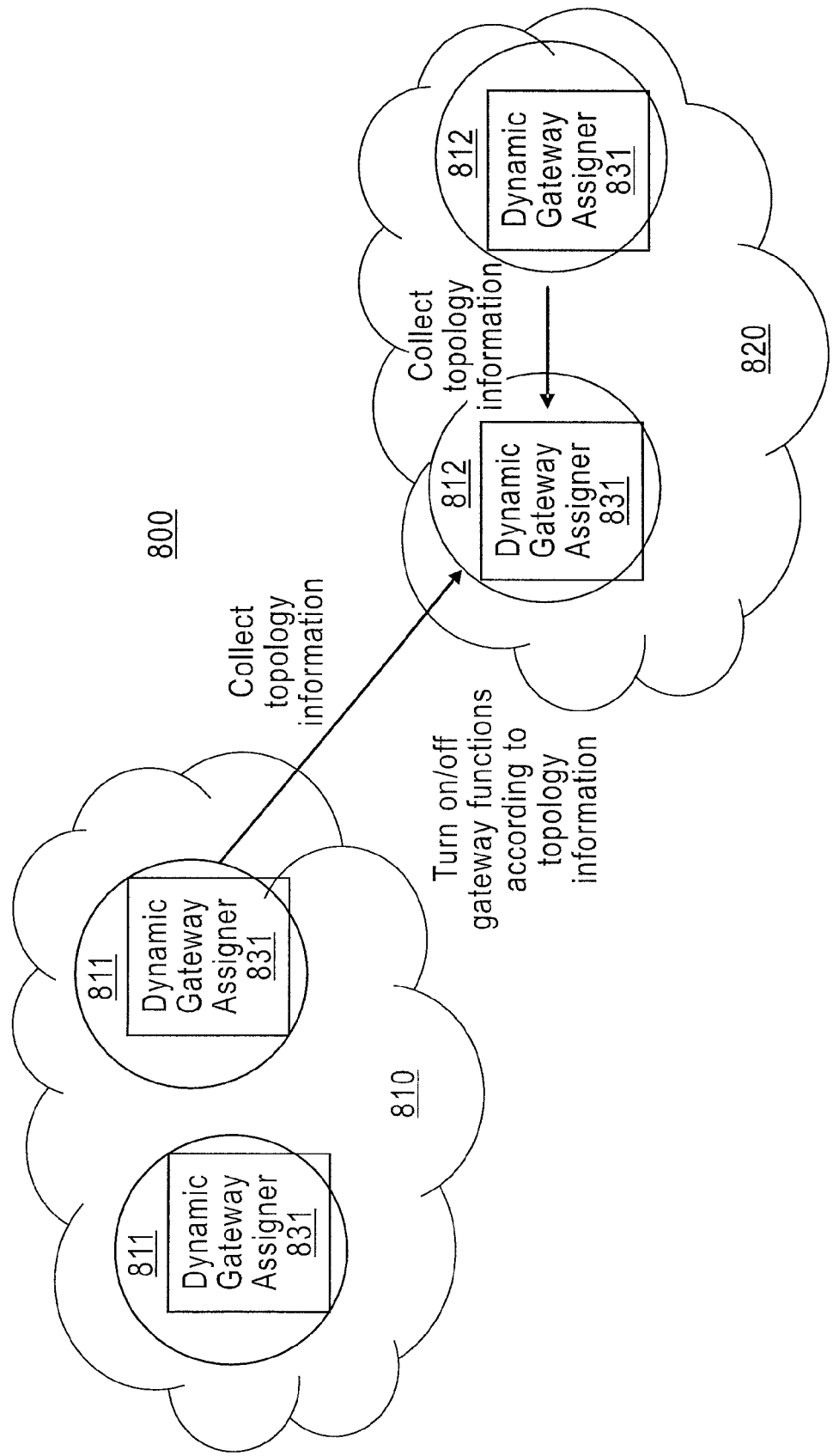
FIG. 8 is a block diagram showing another exemplary system 800 for assigning gateways for heterogeneous wireless mobile networks, according to an embodiment of the present principles.

FIG. 8 shows an exemplary system for assigning gateways for heterogeneous wireless mobile networks, according to an embodiment of the present principles. The system 800 is directed to a distributed embodiment of the present principles. The system 800 includes a first multi-domain mobile ad hoc network 810 having a first set of nodes 811, a second multi-domain mobile ad hoc network 820 having a second set of nodes 812. Each of the nodes in the first set of nodes 811 and the second set of nodes 812 respectively include a dynamic gateway assigner 831. In system 800, the dynamic gateway assigner 831 in the nodes in the first set of nodes 811 and the second set of nodes 812 exchanges routing and connectivity information. Moreover, each of the nodes in the first set of nodes 811 and the second set of nodes 812 determines whether or not to turn on or turn off the gateway functionalities of themselves based on whether such gateway functionalities are redundant with respect to other nodes in the sets. The determinations are made by the respective dynamic gateway assigner 831 in each of the nodes. The functions of the elements of system 800 will be described in further detail hereinafter.

Figure 9:
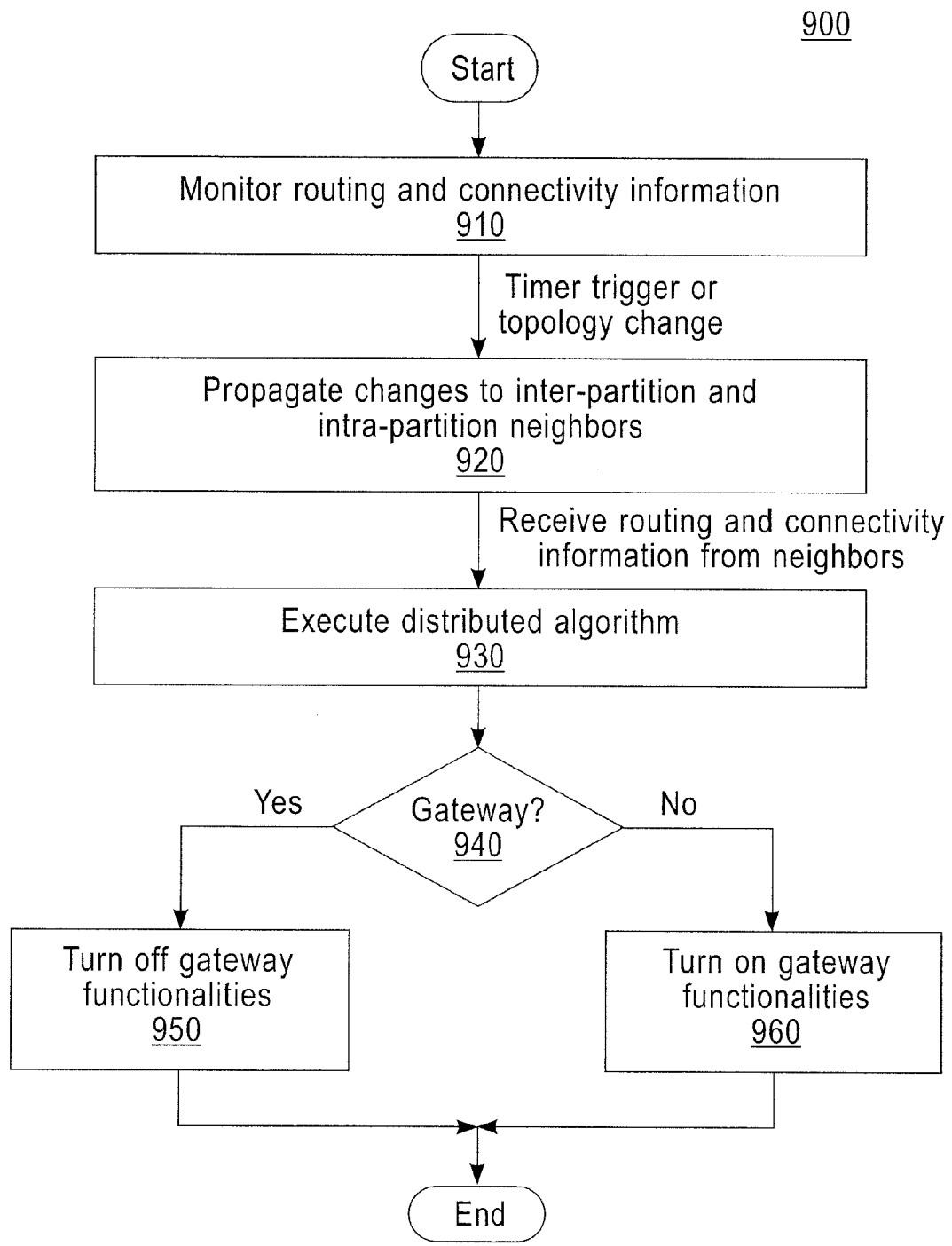
FIG. 9 is a flow diagram showing another exemplary method 900 for assigning gateways for heterogeneous wireless mobile networks, according to an embodiment of the present principles.

FIG. 9 shows another exemplary method 900 for assigning gateways for heterogeneous wireless mobile networks, according to an embodiment of the present principles. The method 900 is directed to a distributed embodiment of the present principles. At step 910, routing and connectivity information is monitored. At step 920, changes are propagated to inter-partition neighbors and intra-partition neighbors (responsive to a timer trigger or topology change detected by the route and connectivity monitoring per step 910). At step 930, the distributed algorithm is executed (responsive to the receive route and connectivity information from neighbors). At step 940, it is determined whether or not the current node is a gateway. If so, then control is passed to a step 950. Otherwise, control is passed to a step 960. At step 950, the gateway functionalities are turned on. At step 960 the gateway functionalities are turned off.

Minimal Gateway Assignment Problem

We now formally formulate the gateway assignment to support interoperation subject to connectivity constraint.

First, consider a set of potential gateways that belong to different partitions. We suppose that a gateway can belong to only one partition. A pair of neighboring gateways can act for a bridge for the nodes in their respective partitions.

Given a connected graph $\mathcal{G}=(\mathcal{V}, \epsilon)$ as the topology of gateways in multi-partition MANETs, where each node $n \in \mathcal{V}$ is a potential gateway. Then we partition the set $\mathcal{V}$ as $\mathcal{P}$, which represents the collection of disjoint connected subgraphs of $\mathcal{G}$ (i.e., the set of partitions), such that $\mathcal{P}$ satisfies the following constraints:

(1) (Connectedness): For each subgraph where $\mathcal{V}_i \subset \mathcal{P}, \mathcal{G}_i$, is a subgraph of $\mathcal{G}$ and $\mathcal{G}_i$ is a connected graph.

(2) (Disjointness): For any pair of subgraphs $\mathcal{G}_1 = \mathcal{V}_i, \epsilon$), $\mathcal{G}(\mathcal{V}_j, \epsilon_j)$, we have $\mathcal{V}_i \cap \mathcal{V}_j = \emptyset$, and $$\cup_{\mathcal{G}_i = (\mathcal{V}_i, \epsilon_i): \mathcal{V}_i \subset \mathcal{P}} \mathcal{V}_i = \mathcal{V}$$

Namely, we assume that the gateways in each domain are connected (i.e., by direct connections or indirect connections through other non-gateway nodes). We note that an administrative domain that is partitioned into multiple sub-networks without intra-domain connectivity will be regarded as multiple partitions.

Given a subset $\mathcal{N} \subseteq \mathcal{V}$, we define the partition-level graph with each node as a partition in $\mathcal{P}$ as $\mathcal{G}_{dm}[\mathcal{N}] = (\mathcal{P}, \mathcal{L}_{dm}(\mathcal{P}, \mathcal{N}))$, where the set of links $\mathcal{L}_{dm}(\mathcal{P}, \mathcal{N})$ is defined as follows:

(Inter-partition Links): For a pair of distinct partitions $\mathcal{P}$, $\mathcal{P} \in \mathcal{P}, (\mathcal{P}, \mathcal{P}) \in \mathcal{L}_{dm}(\mathcal{P}, \mathcal{N})$ if there exist n, n'$\in \mathcal{N}$, such that n$\in \mathcal{V}$ n'$\in \mathcal{V}$, and (n, n')$\in \epsilon$.

FIG. 10 shows a topology 1000 of a mobile ad hoc network (MANET), according to an embodiment of the present principles. FIG. 11 shows a partition-level graph 1100 for the MANET of FIG. 10, according to an embodiment of the present principles. The MANET shown in FIGS. 10 and 11 involve four partitions, namely Partition, Partition B, Partition C, and Partition D. The selected gateway nodes are indicated with a J (check mark). The gateway assignment for the MANET of FIG. 10 provides the minimal number of gateways to enable the cross-partition communications of four partitions. The topology A "gateway assignment" is a subset of nodes $\mathcal{N} \subseteq \mathcal{V}$, such that the partition-level graph $\mathcal{G}_{dm}[\mathcal{N}] = (\mathcal{P}, \mathcal{L}_{dm}(\mathcal{P}, \mathcal{N}))$ is connected. That is, a node is assigned as an (active) gateway, if it is in the assignment $\mathcal{N}$.

Definition 1: (Minimal Gateway Assignment Optimization Problem, MGA($\mathcal{G}, \mathcal{P}$)). Given a connected graph $\mathcal{G} = (\mathcal{V}, \epsilon)$, and a collection of disjoint connected subgraphs $\mathcal{P}$ of $\mathcal{G}$, we find a gateway assignment $\mathcal{N}$ with the smallest size $|\mathcal{N}|$.

Definition 2: (Minimal Gateway Assignment Decision Problem, MGA($\mathcal{G}, \mathcal{P}, \Delta$)). Given a connected graph $\mathcal{G} = (\mathcal{V}, \epsilon)$, and a collection of disjoint connected subgraphs $\mathcal{P}$ of $\mathcal{G}$, we decide if there exists a gateway assignment $\mathcal{N}$, such that $|\mathcal{N}| \leq \Delta$.

Theorem 1: Minimal gateway assignment decision problem MGA($\mathcal{G}, \mathcal{P}, \Delta$) is NP-complete.

Proof: It is easy to show that the gateway assignment decision problem is in NP, by checking the connectivity of graph $\mathcal{G}_{gw}[\mathcal{N}]$ and $|\mathcal{N}| \Delta$, for a given gateway assignment $\mathcal{N}$.

To show MGA($\mathcal{G}, \mathcal{P}, \Delta$) is NP-hard, we rely on a polynomial time reduction from the 3SAT problem.

Definition 3: (3SAT Problem) Consider a 3-CNF formula F that includes m clauses and h variables, i.e. $F = c_1 \wedge c_2 \wedge \ldots c_m$, where each $c_i = y_{j_1} \vee y_{j_2} \vee y_{j_3}$ and $y_{j_1}, y_{j_2}, y_{j_3} \in \{x_1, \bar{x}_1, \ldots, x_h, \bar{x}_h\}$. F is said to be satisfiable, if there exists a truth assignment to F, such that every clause has at least one true variable. 3SAT is well-known to be NP-complete.

Given a 3-CNF formula F, we assume each clause does not include a literal and its complement (as this is trivially satisfiable). We construct a corresponding MGA($\mathcal{G}, \mathcal{P}, \Delta$), such that F is satisfiable, if and only if MGA($\mathcal{G}, \mathcal{P}, \Delta$) is satisfiable.

First, we set $\mathcal{V} = \emptyset, \epsilon = \emptyset$ and $\mathcal{P} = \emptyset$. For each literal $x_j, \bar{x}_j$ we add two nodes $x_j, \bar{x}_j \in \mathcal{V}$, and create a subgraph $\mathcal{G}_{x_j} = (\mathcal{V} x_j,$ $\epsilon_{x_j} \in \mathcal{P}$, such that $\mathcal{V}_{x_j} = \{x_j, \overline{x}_j\}$ and $\epsilon = \{(x_j, \overline{x}_j)\}$. Then, set $\epsilon = \cup_{h=1,\ldots,h} \epsilon_{x_j}$. Moreover, we add edges $(x_{j_1}, x_{j_2})$, $(x_{j_1}, \overline{x}_{j_2})$, $(\overline{x}_{j_1}, x_{j_2})$, $(\overline{x}_{j_1}, \overline{x}_{j_2}) \in \epsilon$ for each pair of literals $x_{j_1}, x_{j_2}$.

Next, for each clause $c_i = y_{j_1} \vee y_{j_2} \vee y_{j_3}$, we add one node $c_i \in \mathcal{V}$, and create a subgraph $\mathcal{G}_{c_i} = (\{c_i\}, \emptyset) \in \mathcal{P}$. If $y_{j_1} = x_{j_1}$, then add an edge $(c_i, x_{j_1}) \in \epsilon$. Else if $y_{j_1} = \overline{x}_{j_1}$, then add an edge $(c_i, \overline{x}_{j_1}) \in \epsilon$. Finally, we set $\Delta = h+m$.

It is easy to see that the construction of $(\mathcal{G}, \mathcal{P})$ is polynomial in time. FIG. 12 shows an illustration of the construction 1200 of MGA($\mathcal{G}, \mathcal{P}, \Delta$) for a given formula F, according to an embodiment of the present principles. In the example of FIG. 12, the given formula $F = (x_1 \vee \overline{x}_2 \vee \overline{x}_3) \wedge (\overline{x}_1 \vee x_2 \vee x_3) \vee (x_1 \vee x_2 \vee x_3)$. Moreover, the dashed circles indicate the nodes belonging to the same partition. The truth assignment is $x_1 = 0$, $x_2 = 0$, $x_3 = 1$, which is depicted as a gateway assignment with the selected nodes indicated by a √ (check mark).

(If Part): We show if F is satisfiable, then MGA($\mathcal{G}, \mathcal{P}, \Delta$) is satisfiable with a gateway assignment $\mathcal{N}$ such that $|\mathcal{N}| = \Delta$. First, we set $\mathcal{N} = \emptyset$. Then for each clause $c_i$, we add $c_i \in \mathcal{N}$. Next, for each variable $\overline{x}_j$ either one of $x_j$ or $\overline{x}_j$ is true. If $x_j$ is true, then we add $x_j \in \mathcal{N}$. Otherwise, if $\overline{x}_j$ is true, then we add $\overline{x}_j \in \mathcal{N}$. It is easy to see that the partition-level graph $\mathcal{G}_{dm}[\mathcal{N}] = (\mathcal{P}, \mathcal{L}_{dm}(\mathcal{P}, \mathcal{N}))$ is connected, and $|\mathcal{N}| = h+m$.

(Only-if Part): We show if MGA($\mathcal{G}, \mathcal{P}, A$) is satisfiable. Suppose $\mathcal{N}$ is the satisfiable gateway assignment. Since each $c_i$ is a partition with one single node, $c_i \in \mathcal{N}$. Hence, this takes up m nodes. Next, each pair of $x_j, \overline{x}_j$ are a domain. There are h domains. That implies that only one of $x_j, \overline{x}_j$ is in $\mathcal{N}$. This gives rise to a consistent assignment for each variable. Also, since the partition-level graph $\mathcal{G}_{dm}[\mathcal{N}] = (\mathcal{P}, \mathcal{L}_{dm}(\mathcal{P}, \mathcal{N}))$ is connected, each $c_i$ is connected to at least one $x_i$ or $\overline{x}_j$. Hence, every clause is satisfiable.

Therefore, we show that MGA ($\mathcal{G}, \mathcal{P}, \Delta$) is NP-hard, because 3SAT problem is NP-complete.

Since MGA($\mathcal{G}, \mathcal{P}, \Delta$) is NP-complete, the optimization problem MGA($\mathcal{G}, \mathcal{P}$) is unlikely to be solvable in polynomial time. However, we next present a simple greedy algorithm that yields a constant approximation bound.

Centralized Gateway Assignment Algorithms

We first present SimpCen, a simple centralized algorithm for MGA($\mathcal{G}, \mathcal{P}$) based on a greedy heuristic. In SimpCen, in each step, a pair of inter-partition neighbors is put into gateway assignment $\mathcal{N}$ when such assignment can improve the connectivity at the partition-level topology. We let Comp($\mathcal{G}$) be the number of disjoint components in a graph $\mathcal{G}$.

Algorithm 1 SimpCen: Input ($\mathcal{G}, \mathcal{P}$), Output $\mathcal{N}$

1: $\mathcal{N} \leftarrow \emptyset$
2: for each $(n, n') \in \epsilon$ do
3:    if Comp($\mathcal{G}_{dm}[\mathcal{N}]$) > Comp($\mathcal{G}_{dm}[\mathcal{N} \cup \{n, n'\}]$) then
4:       $\mathcal{N} \leftarrow \mathcal{N} \cup \{n, n'\}$
5:    end if
6: end for
7: return $\mathcal{N}$ It is easy to see that the runtime of SimpCen is $O(|\epsilon| \cdot (|\mathcal{V}| + |\epsilon|v))$, because the runtime to find out the number of components in the partition-level graph takes $O(|\mathcal{V}| + |\epsilon|)$ by using breadth-first search with hash tables to store the visited nodes and partitions.

Theorem 2: Given minimal gateway assignment problem MGA($\mathcal{G}, \mathcal{P}$), let $\mathcal{N}_{opt}$ be the gateway assignment such that $|\mathcal{N}_{opt}|$ is the smallest. Let $\mathcal{N}_{SimpCen}$ be the gateway assignment output by SimpCen. Then, we have the following:

$$|\mathcal{N}_{SimpCen}| \leq |\mathcal{N}_{opt}| \cdot 2$$

That is, SimpCen is at least as good as the 2-approximation polynomial-time algorithm for the MGA($\mathcal{G}, \mathcal{P}$) problem.

Proof: The proof is given in the Appendix. Now we show that the analysis in Theorem 2 is tight.

Theorem 3: For any constant $\ominus > 0$, there exists an instance on which SimpCen outputs $\mathcal{N}_{SimpCen}$ which $|\mathcal{N}_{SimpCen}| > (2|\mathcal{N}_{opt}| - 2) - \ominus$.

Proof: The proof is given in the Appendix.

To improve the performance of SimpCen, a heuristic is to check thoroughly to make sure that the selected nodes as gateways will always give the largest decrease in the number of disjoint components with the smallest number of gateway assignment in each step. This gives the algorithm Cen.

For each node $n \in \mathcal{P}$, we denote the $Nb^{ita}(n)$ as the intra-partition neighbors of n, and n is always connected to $Nb^{ita}(n)$. The inter-partition neighbors of n is denoted as $Nb^{itd}(n)$:

$$Nb^{itd}(n) \triangleq \{n' | n' \in \mathcal{V} \setminus Nb^{ita}(n) \text{ and } (n, n') \in \epsilon\}$$

Algorithm 2 Cen: Input ($\mathcal{G}, \mathcal{P}$), Output $\mathcal{N}$

1: $\mathcal{N} \leftarrow \emptyset$
2: repeat
3:   for each $n \in \mathcal{V} \setminus \mathcal{N}$ do
4:     $X(n) \leftarrow n$
5:     for each $n' \in Nb^{itd}(n)$ do
6:       if Comp($\mathcal{G}_{dm}[\mathcal{N}]$) > Comp($\mathcal{G}_{dm}[\mathcal{N} \cup X(n)]$) then
7:         $X(n) \leftarrow X(n) \cup n'$
8:       end if
9:     end for
10:    $W(n) \leftarrow$ Comp($\mathcal{G}_{dm}[\mathcal{N}]$) - Comp($\mathcal{G}_{dm}[\mathcal{N} \cup X(n)]$)
11:   end for
12:   $\mathcal{V}^* \leftarrow \arg\max_{n \in \mathcal{V} \setminus \mathcal{N}} W(n)$
13:   $n^* \leftarrow \arg\min_{n \in \mathcal{V}^*} |X(n)|$
14:   if $W(n^*) > 0$ then
15:     $\mathcal{N} \leftarrow \mathcal{N} \cup X(n^*)$
16:   end if
17: until $W(n^*) > 0$
18: return $\mathcal{N}$ In each iteration, Cen selects a node that needs a minimal number of new gateways that help to connect the maximum number of disjoint components. The value X(n) defined in line 4 and updated in line 7 refers to the set of new nodes needed to assign into $\mathcal{N}$ (i.e., to become gateways) in order to reduce the number of disjoint components in $\mathcal{G}_{dm}[\mathcal{N}]$ and the value of W(n) defined in line 10 refers to the number of disjoint components that can be connected if X(n) are assigned into $\mathcal{N}$. Random tie-breaking is applied when there are multiple $n^*$.

Following a similar proof as the one in Theorem 2, it is easy to see that Cen is at least as good as 2-approximation, because Cen only assigns a gateway if the assignment reduces the number of disjoint components in $\mathcal{G}_{dm}$. The runtime of Cen is $O(|\mathcal{V}| \cdot |\epsilon| \cdot (|\mathcal{V}| + |\epsilon|))$, since for each n we only calculate Comp $\mathcal{G}_{dm}[\mathcal{N} \cup \{n, n'\}]$, for $\{n, n'\} \in \epsilon$ which is bounded by $|\epsilon|$.

Figure 14:
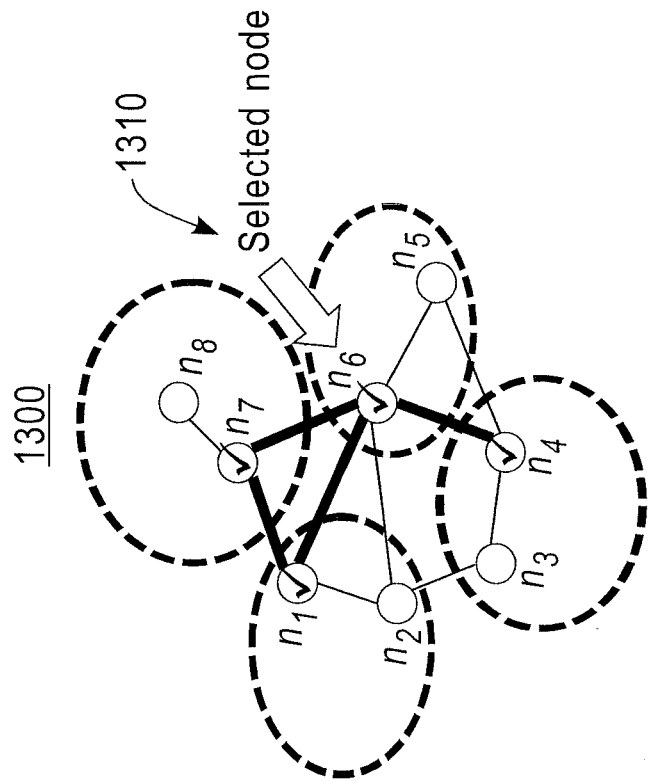
FIG. 14 shows step one 1310 of the gateway assignment 1300 by the Cen algorithm, according to an embodiment of the present principles.
Figure 13:
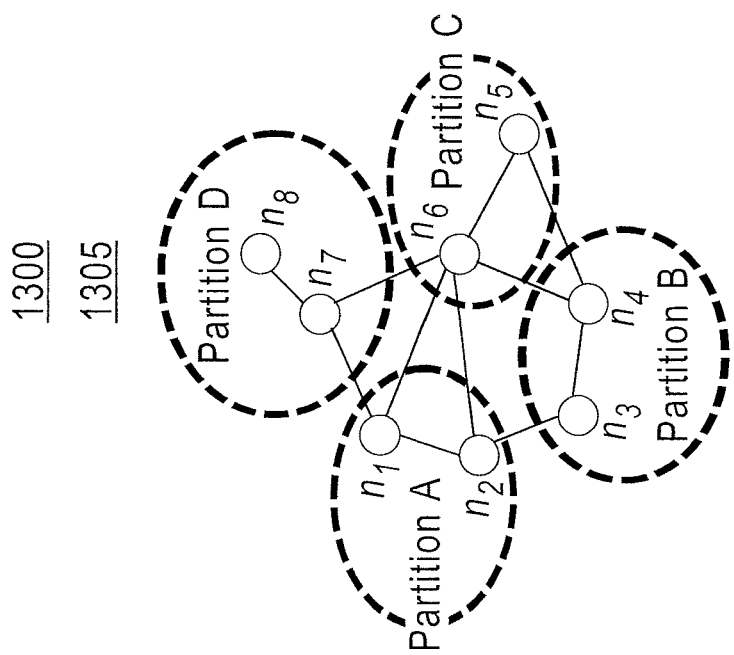
FIG. 13 shows the initial state 1305 of a gateway assignment 1300 by the Cen algorithm according to an embodiment of the present principles.

FIGS. 13 and 14 provide an illustrative example for the execution of the Cen algorithm with 4 partitions, 8 nodes and their corresponding connectivity. In particular, FIG. 13 shows the initial state 1305 of a gateway assignment 1300 by the Cen algorithm according to an embodiment of the present principles, and FIG. 14 shows step one 1310 of the gateway assignment 1300 by the Cen algorithm, according to an embodiment of the present principles. The selected gateways are indicated by a √ (check mark). Initially, the set $\mathcal{N}$ is empty $n_6$ is added into $\mathcal{N}$ because $n_6$ makes the most number of new connected partitions among all $n_i \in \mathcal{V}$ (i.e., $W(n_6) = 3$). After $n_6$ is added, $n_1$, $n_4$ and $n_7$ are also assigned into $\mathcal{N}$ because $n_1, n_4, n_7 \in Nb^{itd}(n_6)$ (i.e., they are the inter-partition neighbors of $n_6$). Notice that although $n_2 \in Nb^{itd}(n_6)$, $n_2$ is not assigned into $\mathcal{N}$ because Partition-A and Partition-B are already connected with $n_1, n_6 \in \mathcal{N}$. Finally, the algorithm terminates with $|\mathcal{N}_{cen}|=4$.

Distributed Gateway Assignment Algorithms

In the distributed algorithms, a node decides that if it becomes active gateway or not according to the connectivity information collected from its intra- and inter-partition neighbors. For simplicity, we assume the following:

(A1) Network topology changes at a slower rate compared to the convergence speed of the gateway assignment algorithm (i.e., the topology is stable during the execution of algorithm).

(A2) Each node can learn $Nb^{ita}$ from the intra-domain routing protocols (e.g., Destination-Sequenced Distance-Vector Routing Protocol (DSDV), Optimized Link State Routing Protocol (OLSR)), and $Nb^{itd}$ by proper neighbor discovery mechanisms.

(A3) At any point in time, only one node makes the decision. This can be approximated by various mechanisms, e.g., exponential backoff timer. More discussion on this issue is set forth with respect to Remarks 1 and 4.

(A4) When node n assigns itself as a gateway, it will propagate the assignment decision throughout the entire network. Other nodes will progressively learn the $\mathcal{N}_t$ (i.e., $\mathcal{N}$ at step t) by receiving such notifications. We will show how to relax this assumption hereinafter.

We present two classes of distributed algorithms herein, with full and partial topology information. In both cases, we assume that nodes agree to help each other and share their connectivity information. For the algorithms with full information, we further design two algorithms with different levels of cooperation among the nodes in different partitions, namely, tightly cooperative and loosely cooperative algorithms. We now describe them in detail.

Tightly Cooperative Algorithms with Full Topology Information

First, we describe a simple procedure to construct the weights W(n) and X(n) of Cen in a distributed fashion without the knowledge of the whole topology G. One main factor is the number of disjoint components in the partition-level graph, Comp($\mathcal{G}_{dm}[\mathcal{N}_t]$). Suppose each node only knows the inter-domain neighbors $Nb^{itd}$ and intra-domain neighbors $Nb^{ita}$. At each step, each node maintains a partial graph $\mathcal{G}_{dm}[\mathcal{N}_t]$ by exchanging the list of connected partitions from the inter-domain neighbors and intra-domain neighbors. Progressively, a complete topology $\mathcal{G}_{dm}[\mathcal{N}_t]$ can be obtained that requires the message complexity at most $O(|\epsilon| \cdot |\mathcal{P}|)$. Now we consider two algorithm designs.

(1) Naive Algorithm: One simple way to design a distributed algorithm is to randomly select a node n at one time instant and assign both n and the set of its inter-partition neighbors $Nb^{itd}(n)$ to be the set of gateways $\mathcal{N}$. One benefit of this simple approach is that the design of the distributed protocol will be simpler and the computation overhead is limited. This naive approach is used as a baseline for comparison hereinafter.

(2) Distributed Tightly Cooperative Algorithm: In this algorithm DIS-Tight, we assume that a suitable timeout mechanism is in place to coordinate the decision process among the nodes. Assuming that timer granularity is larger than the propagation time within a domain, only one node will make decision at a time. When the backoff timer expires at node n, node n then collects the W(n') and X (n') from all $n' \in Nb^{ita}(n)$ (i.e., the intra-partition neighbors of n), and find out the optimal node to become the gateway in $\mathcal{P}(n)$, where $\mathcal{P}(n)$ is defined as the partition that node n belongs to. If node n is not the optimal node, it starts the timer again and waits for the next turn. Otherwise, node n assigns itself as a gateway and requests X (n) to become gateways as well, and broadcast the decision. Note that although DIS-Tight is triggered by an exponential backoff timer, the process of collecting information for partition-level graph $\mathcal{G}_{dm}[\mathcal{N}_t]$ is assumed to run in the background triggered by the broadcast events.

Theorem 4: The number of gateways assigned by DIS-Tight, $|\mathcal{N}_{DIS-Tight}|$, bounded by $2|\mathcal{N}_{opt}|$ where $\mathcal{N}_{opt}$ is the gateway assignment such that $|\mathcal{N}_{opt}|$ is the smallest. That is, DIS-Tight is a 2-approximation.

---

Algorithm 3 DIS-Tight: Input (event)

```
 1: if event = timer-expired then
 2:    //deciding whether to be a gateway or not
 3:    collect W(n) and X(n) from Nb^ita(self)
 4:    V* ← arg max_{n∈Nb^ita(self)} W(n)
 5:    n* ← arg max_{n∈V*} |X(n)|
 6:    if n*=(self) then
 7:       //decided to be a gateway
 8:       stop timer
 9:       N_t ← N_{t-1} ∪ {n*} ∪ X(n*)
10:       //propagate the partition-level connectivity information
11:       broadcast N_t and G_{dm}[N_t]
12:    else if W(n*) = 0 then
13:       //n* cannot reduce no. of disconnected components
14:       stop timer
15:    else
16:       //wait for another time instant for decision
17:       start timer
18:    end if
19: end if
20:
21: if event = broadcast N_t and G_{dm}[N_t] then
22:    update N_t and G_{dm}[N_t]
23: end if
24:
25: //updating the weights used for gateway assignment decisions
26: if event=request W(n) and X (n) then
27:    X(n) ← Ø
28:    for each n' ∈ Nb^itd(n) do
29:       if Comp(G_{dm}[N_t]) > Comp(G_{dm}[N_t ∪ X(n)]) then
30:          X (n) ← X (n) ∪ n'
31:       end if
32:    end for
33:    W(n) ← Comp(G_{dm}[N_t]) - Comp(G_{dm}[N_t ∪ {n} ∪ X(n)])
34:    return W(n) and X (n)
35: end if
```

Proof: The proof is given in the Appendix.

Theorem 5: The distributed process of DIS-Tight will terminate at a correct state where all partitions are connected in finite steps.

Proof: The proof is given in the Appendix.

Figure 17:
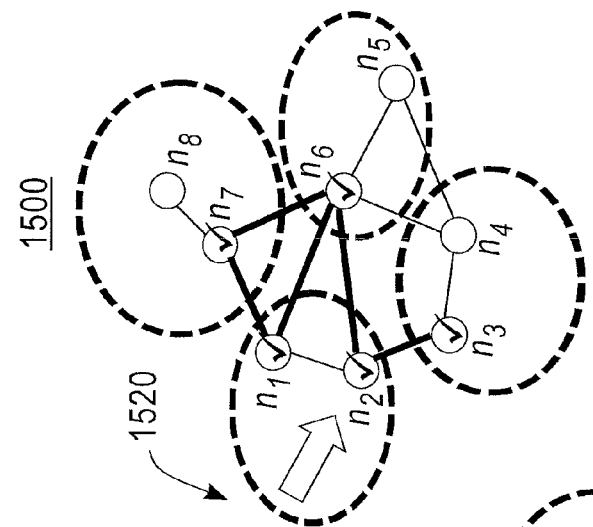
FIG. 17 shows step two 1520 of the gateway assignment 1500 by DIS-Tight, according to an embodiment of the present principles.
Figure 16:
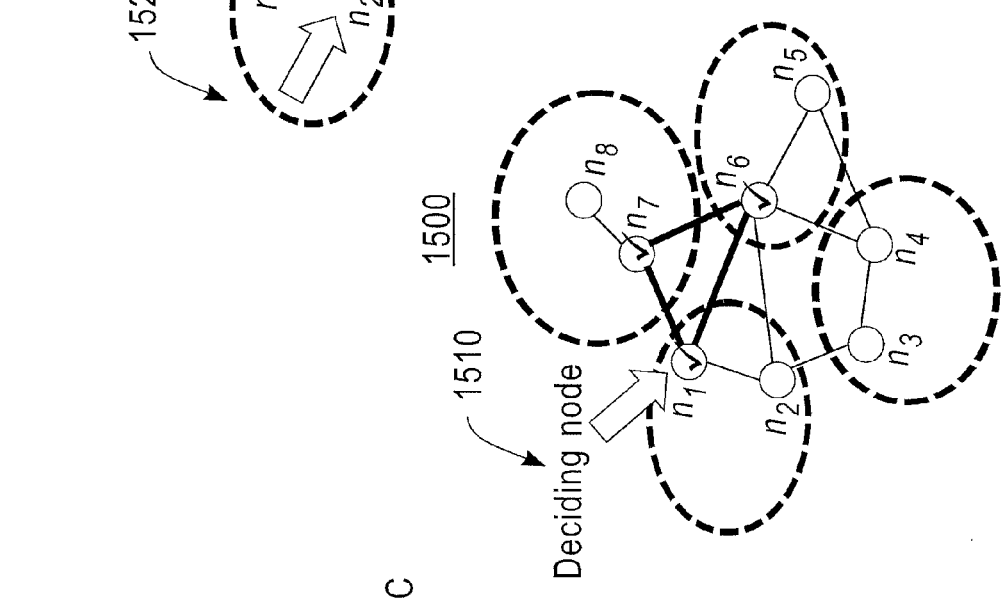
FIG. 16 shows step one 1510 of the gateway assignment 1500 by DIS-Tight, according to an embodiment of the present principles.
Figure 15:
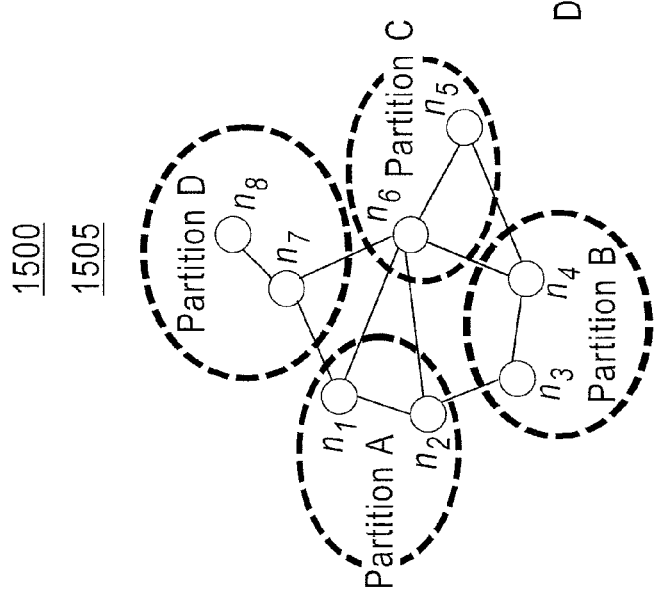
FIG. 15 shows the initial state 1505 of a gateway assignment 1500 by DIS-Tight, according to an embodiment of the present principles.

FIGS. 15, 16, and 17 provide an illustrative example for the execution of DIS-Tight. In particular, FIG. 15 shows the initial state 1505 of a gateway assignment 1500 by DIS-Tight, according to an embodiment of the present principles. FIG. 16 shows step one 1510 of the gateway assignment 1500 by DIS-Tight, according to an embodiment of the present principles. FIG. 17 shows step two 1520 of the gateway assignment 1500 by DIS-Tight, according to an embodiment of the present principles. The selected gateway nodes are indicated with a √ (check mark). In this example, nodes wake up with the sequence $n_1, n_2, n_3, \ldots$, and they execute the DIS-Tight algorithm when their timer expires. $n_1$ assigns itself as an active gateway because $W(n_1)=W(n_2)=2>0$ (tiebreaks with node ID). Similar to the centralized algorithm, when $n_1$ is assigned as a gateway, $n_6$, $n_7$, are also assigned as gateways. In the next step, $n_2$ wakes up and assigns itself as gateway because $W(n_2)=1>0$, and $n_3$ are also assigned as gateway. After this step, when the remaining nodes wake up, they will stop their timer because of $W(n)=0$. Finally, the algorithm terminates with $|\mathcal{N}_{DIS\text{-}Tight}|=5$.

Remark 1: (Exclusive execution of DIS-Tight). In general, there is no efficient mechanism to ensure only one node to execute a distributed procedure in the large MANETs environment because that requires either complete locking of all nodes or synchronization of timers. One practical way to "roughly" achieve this condition is to utilize an exponential backoff timer, which has been used extensively in the IEEE 802.11 and the Ethernet protocols, to reduce the probability of simultaneously triggering a distributed procedure at different nodes. We thus apply an exponential backoff mechanism in DIS-Tight.

Even if the timers expire simultaneously in DIS-Tight, it does not affect the correctness of DIS-Tight because DIS-Tight only assigns nodes to become gateways but not disables gateways. When more nodes become gateways, the partition-level graph will eventually reduce to one single connected component. However, the result in Theorem 4 may not hold because executes DIS-Tight simultaneously may lead to a suboptimal solution. We leave the users of DIS-Tight to decide whether (i) the number of gateways in the network, or (ii) communication overhead for locking or synchronization, is more important in operation.

Remark 2: (When to execute DIS-Tight). Ideally, DIS-Tight should be executed whenever the topology is changed (i.e., resetting the gateway assignment). On the other hand, executing DIS-Tight will incur communication overhead and extensive changes to the active gateway set. With practical models of link characteristics such as the expected lifetime and change rate, one can further optimize when to execute DIS-Tight (e.g. aggregate multiple events of topology changes). In practice, each partition can execute DIS-Tight (i) periodically at certain time interval, or (ii) when partition-level topology changes have been detected.

Loosely Cooperative Algorithms with Full Topology Information

The assumption of DIS-Tight that a node in other partition will always follow the request from a node making a decision may not be valid. In general, nodes in each partition should make its own decision based on its energy level and other considerations such as its mobility and mission objectives. Therefore we consider a case of "loosely" cooperative model where the nodes in each partition are willing to optimize the global objective, but without enforcement from the outside partition. In this case, a node n can decide if it wants to become an active gateway based on the number of gateways in $Nb^{itd}(n)$ and the size of $Nb^{itd}(n)$. The main idea behind this algorithm is fairly simple: if node n has more number of inter-partition neighbors and gateways, the chance to reduce the number disconnected components in the partition-level graph will be higher if node n is a gateway. We consider two versions of loosely cooperative algorithms.

(1) Naive Algorithm: Similar to the naive algorithm herein, when the timer of node n is expired, it assigns itself as an active gateway. The only difference between the loosely cooperative and tightly cooperative version is that in the loosely cooperative version, node n does not assign its inter-partition neighbors as gateways. This naive algorithm is used as a baseline for comparison hereinafter.

| Algorithm 4 DIS-Loose: Input (event) |
|---|
| 1:   if event = timer-expired then |
| 2:     collect WS(n), $NG^{itd}(n)$ and $Nb^{itd}(n)$ from $n \in Nb^{ita}$ (self) |
| 3:     $\mathcal{V}^* \leftarrow \arg\max_{n \in Nb^{ita}(self)} WS(n)$ |
| 4:     $n^* \leftarrow \arg\max Nb^{itd}(\arg\max_{n \in \mathcal{V}^*} NG(n))$ |
| 5:     if $n^*$ = self then |
| 6:       stop timer |
| 7:       $\mathcal{N}_t \leftarrow \mathcal{N}_{t-1} \cup \{n^*\}$ |
| 8:       broadcast $\mathcal{N}_t$ and $\mathcal{G}_{dm}[\mathcal{N}_t]$ |
| 9:     else if $Nb^{itd}(\text{self}) \subseteq Nb^{itd}(NG^{ita}(\text{self}))$ then |
| 10:       stop timer |
| 11:     else |
| 12:       start timer |
| 13:     end if |
| 14:   end if |
| 15: |
| 16:   if event=broadcast $\mathcal{N}_t$ and $\mathcal{G}_{dm}[\mathcal{N}_t]$ then |
| 17:     update $\mathcal{N}_t$ and $\mathcal{G}_{dm}[\mathcal{N}_t]$ |
| 18:   end if |
| 19: |
| 20:   if event=request WS(n), $NG^{itd}(n)$ and $Nb^{itd}(n)$ then |
| 21:     $WS(n) \leftarrow Comp(\mathcal{G}_{dm}[\mathcal{N}_t]) - Comp(\mathcal{G}_{dm}[\mathcal{N}_t \cup \{n\}])$ |
| 22:     return WS(n), $NG^{itd}(n)$ and $Nb^{itd}(n)$ |
| 23:   end if |

(2) Distributed Loosely Cooperative Algorithm: Similar to the tightly cooperative version, when node n timer expires, it collects the WS (n'), NG (n') from all $n' \in Nb^{ita}(n)$, and finds out the optimal node to become the gateway in $\mathcal{P}$ (n). Different from Cen and DIS-Tight, WS(n) is defined as follows:

$$WS(n) \triangleq Comp(\mathcal{G}_{dm}[\mathcal{N}_t]) - Comp(\mathcal{G}_{dm}[\mathcal{N}_t \cup \{n\}])$$

which means the reduction in the number of disconnected components in $\mathcal{G}_{dm}(n)$ when only node n is assigned to $\mathcal{N}_t$. $NG^{ita}(\ )$, and $NG^{itd}(n)$ are defined as follows:

$$NG^{ita}(n) \triangleq \{n' | n' \in \mathcal{N} \cap Nb^{ita}(n)\}$$

$$NG^{itd}(n) \triangleq \{n' | n' \in \mathcal{N} \cap Nb^{itd}(n)\}$$

which means the set of gateways in the intra-partition and inter-partition neighbors of node n respectively.

Theorem 6: The distributed process of DIS-Loose will terminate at a correct state where all partitions are connected in finite steps.

Figure 18:
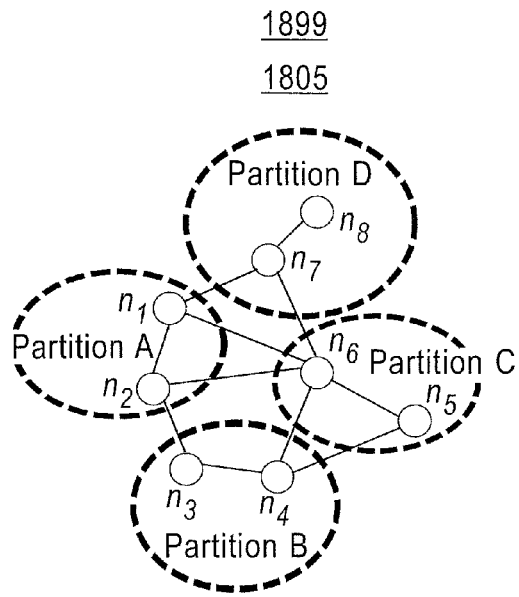
FIG. 18 shows the initial state 1805 of a gateway assignment 1899 by DIS-Loose, according to an embodiment of the present principles.
Figure 19:
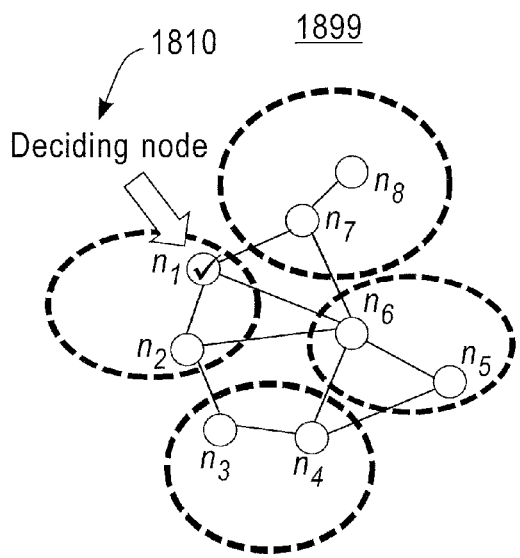
FIG. 19 shows step one 1810 of the gateway assignment 1899 by DIS-Loose, according to an embodiment of the present principles.
Figure 20:
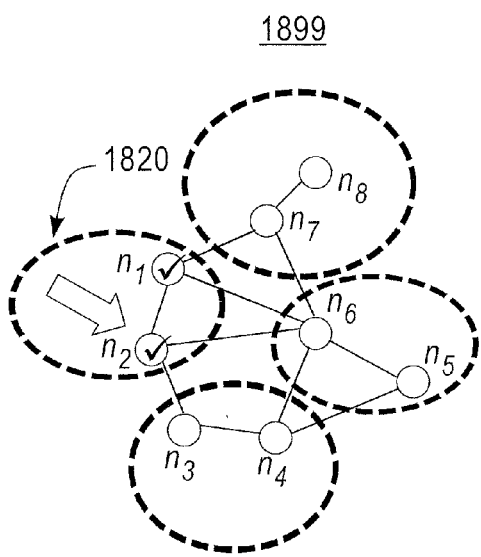
FIG. 20 shows step two 1820 of the gateway assignment 1899 by DIS-Loose, according to an embodiment of the present principles.
Figure 21:
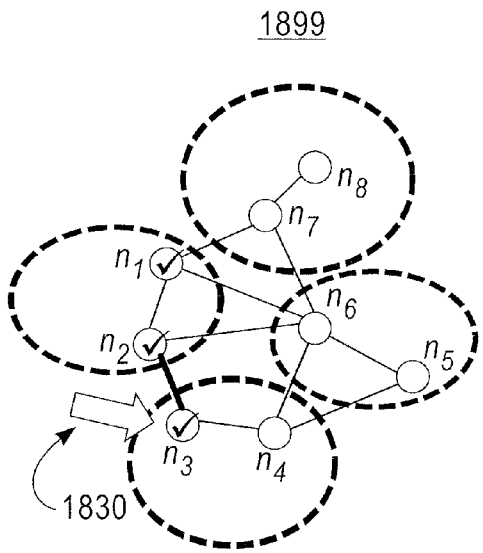
FIG. 21 shows step three 1830 of the gateway assignment 1899 by DIS-Loose, according to an embodiment of the present principles.
Figure 22:
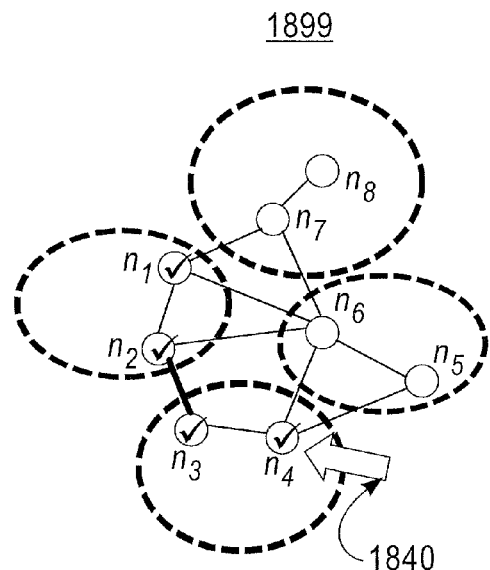
FIG. 22 shows step four 1840 of the gateway assignment 1899 by DIS-Loose, according to an embodiment of the present principles.
Figure 23:
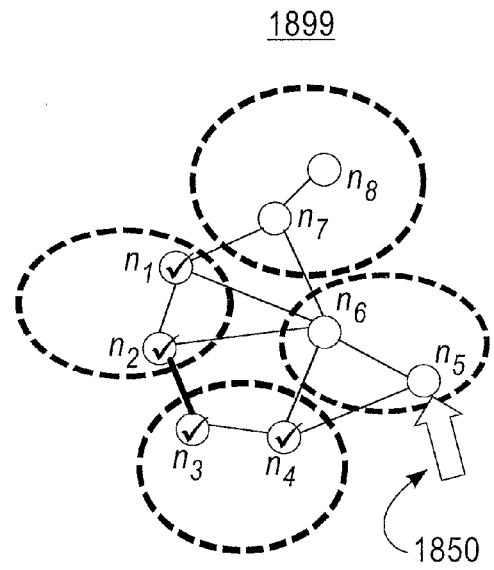
FIG. 23 shows step five 1850 of the gateway assignment 1899 by DIS-Loose, according to an embodiment of the present principles.
Figure 24:
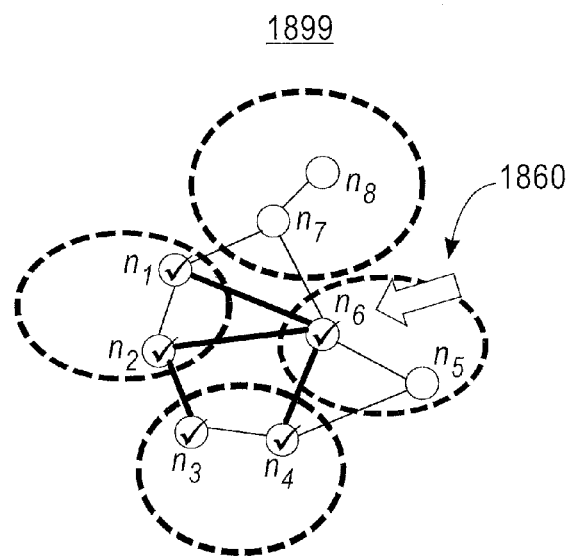
FIG. 24 shows step six 1860 of the gateway assignment 1899 by DIS-Loose, according to an embodiment of the present principles.
Figure 25:
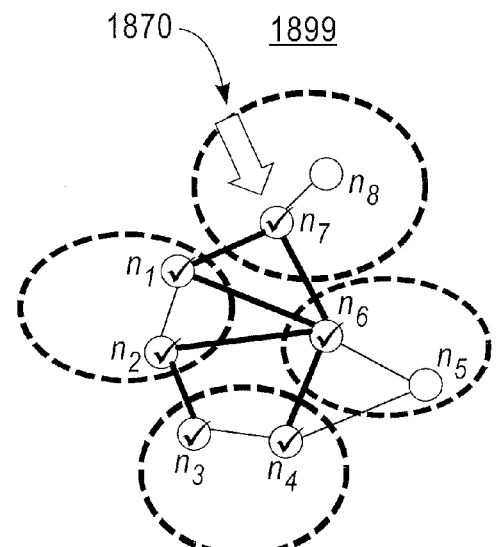
FIG. 25 shows step seven 1870 of the gateway assignment 1899 by DIS-Loose, according to an embodiment of the present principles.

FIGS. 18-25 provide an illustrative example for the execution of DIS-Loose. In particular, FIG. 18 shows the initial state 1805 of a gateway assignment 1899 by DIS-Loose, according to an embodiment of the present principles. FIG. 19 shows step one 1810 of the gateway assignment 1899 by DIS-Loose, according to an embodiment of the present principles. FIG. 20 shows step two 1820 of the gateway assignment 1899 by DIS-Loose, according to an embodiment of the present principles. FIG. 21 shows step three 1830 of the gateway assignment 1899 by DIS-Loose, according to an embodiment of the present principles. FIG. 21 shows step four 1840 of the gateway assignment 1899 by DIS-Loose, according to an embodiment of the present principles. FIG. 23 shows step five 1850 of the gateway assignment 1899 by DIS-Loose, according to an embodiment of the present principles. FIG. 24 shows step six 1860 of the gateway assignment 1899 by DIS-Loose, according to an embodiment of the present principles. FIG. 25 shows step seven 1870 of the gateway assignment 1899 by DIS-Loose, according to an embodiment of the present principles. The selected gateway nodes are indicated with a √ (check mark). In the example of FIG. 18, assume the nodes wake up with the sequence $n_1$, $n_2$, $n_3$, $n_4$, $n_5$, $n_6$, $n_7$, $n_8$. The decision made by each node at each step is presented as follow:

Step 1: $n_1$ decides that it is a gateway because $Nb^{itd}$=2>0, which is the best among the unassigned nodes in Partition-A Step 2: $n_2$ decides that it is a gateway because $Nb^{itd}(n_2)$=2>0, which is the best among the unassigned nodes in Partition-A Step 3: $n_3$ decides that it is a gateway because $WS(n_3)$=1>0, which is the best among the unassigned nodes in Partition-B Step 4: $n_4$ decides that it is a gateway because $Nb^{itd}(n_4)$=2>0, which is the best among the unassigned nodes in Partition-B Step 5: $n_5$ decides that it is not a gateway because $Nb^{itd}(n_5) \subseteq Nb^{itd}(n^6)$ and the optimal node in Partition-C is $n_6$. After $n_6$ is selected as a gateway, $n_5$ stops its timer Step 6: $n_6$ decides that it is a gateway because $WS(n_6)$=2>0, which is the best among the unassigned nodes in Partition-C Step 7: $n_7$ decides that it is a gateway because $WS(n_7)$=2>0

Step 8: $n_8$ decides that it is not a gateway because $Nb^{itd}(n_8) \subseteq Nb^{itd}(n^7)$ Finally, the process terminates with $|\mathcal{N}_{DIS-Loose}|=6$.

Remark 3: (Leader selection in each partition). In DIS-Tight and DIS-Loose, when node n discovers that it is not the optimal node for $\mathcal{P}(n)$, it will sleep and wait for the optimal node to wakeup. We argue that node n should not notify the optimal node in its partition for faster convergence, because if that happens a partition with more nodes will assign gateways at a faster rate than a partition with less nodes. One way to speed up the convergence is to elect a leader for each partition. When the timer at a leader expires, the leader collects the partition connectivity information and assigns the optimal node in its partition to become a gateway. We note that electing a leader for each partition only improves the convergence time but does not reduce the number of gateway assigned by our proposed algorithms.

Tightly Cooperative Algorithms with Partial Information

In some scenarios, $\mathcal{G}$ can be a relatively large graph such that it may take long time to propagate the assignment decision throughout the network. To address this issue, we relax the assumption (A4) such that a node n can make decisions even n only has partial information. In the relaxed assumption (A4), we assume that nodes only collect information from $\mathcal{P}(n)$'s 1-hop neighboring partitions.

| Algorithm 5 DIS-Local: Input (event) |
|---|
| 1:    if event=$Nb^{itd}(\mathcal{V}(self))$ changed then |
| 2:       exponential-backoff-timer( ); |
| 3:       if self is not gateway then |
| 4:          for n in $Nb^{itd}(self)$ do |
| 5:             if $\mathcal{P}(n) \not\subseteq \mathcal{P}(NG^{itd}(NG^{ita}(self)))$ then |
| 6:                 enable self gateway functions |
| 7:                 enable n gateway functions |
| 8:             end if |
| 9:          end for |
| 10:      else |
| 11:         //keep gateways with large $\mathcal{P}(NG^{itd}(n))$| |
| 12:         for n in $NG^{ita}(self)$ do |
| 13:             if $\mathcal{P}(N^{itd}(self)) \subseteq \mathcal{P}(NG^{itd}(n))$ then |
| 14:                 disable self gateway functions |
| 15:             end if |
| 16:         end for |
| 17:         //$\mathcal{P}(NG^{itd}(self))$ already covered by others |
| 18:         if $\mathcal{P}(N^{itd}(self)) \subseteq \mathcal{P}(NG^{itd}(NG^{ita}(self)))$ then |
| 19:            disable self gateway functions |
| 20:         end if |
| 21:      end if |
| 22:    end if |
| 23: |
| 24:    //notify role change to $\mathcal{P}(self)$ |
| 25:    if role change then |
| 26:       broadcast role changes to $\mathcal{P}(self)$ |
| 27:    end if |
| 28: |
| 29:    if event=$Nb^{itd}(self)$ changed then |
| 30:       broadcast $Nb^{itd}(self)$ changes to $\mathcal{P}(self)$ |
| 31:    end if |

Algorithm 5 shows the pseudocode of the gateway assignment algorithm, DIS-Local. The basic idea of DIS-Local is that each partition tries to establish a gateway pair to its 1-hop neighboring partitions. Different from DIS-Tight, a partition, $\mathcal{P}(n)$, in DIS-Local tries to form a 1-level tree root at $\mathcal{P}(n)$ in the partition-level graph. The resulting mesh then will have a richer set of edges in $\mathcal{G}_{dm}[\mathcal{N}]$, compared to the one generated by DIS-Tight.

Similar to the previous distributed algorithms, DIS-Local relies on the exponential backoff timer to achieve exclusive execution. For a node n, when the 1-hop neighborhood of n is changed, n will broadcast such changes to its intra-partition neighbors (lines 29-31). Once the nodes in $\mathcal{P}(n)$ receive that information, they decide which nodes will become gateways. Node n will assign itself as a gateway if one of n's neighboring partitions is not connected by the other gateways in $\mathcal{P}(n)$ (lines 5-8). On the other hand, n will not assign itself as a gateway if all n's neighboring partitions is connected by the other gateways in $\mathcal{P}(n)$ (lines 17-20). A simple heuristic to keep nodes with larger number of connected partitions is applied to reduce the number of gateways in $\mathcal{P}(n)$ (lines 11-16).

Theorem 7: The number of gateways assigned by DIS-Local, $|\mathcal{N}_{DIS-Local}|$, is bounded by $|\mathcal{P}|(|\mathcal{P}|-1)$.

Lemma 1: The worse case performance ratio of DIS-Local over Cen is $$\frac{|\mathcal{P}|}{2}.$$

Theorem 8: DIS-Local guarantees a partition is connected to its 1-hop neighboring partitions if there is no simultaneous execution.

The proofs of Theorem 7, Lemma 1, and Theorem 8 are given in the Appendix.

Remark 4: (Exclusive execution of DIS-Local). Similar to Remark 1 herein, the exponential backoff cannot completely guarantee exclusive execution. When multiple nodes are executing DIS-Local simultaneously, a partition can be disconnected from its 1-hop neighboring partitions. We argue that this will only slow down the convergence speed of DIS-Local because the disconnection will be detected eventually as far as the exponential backoff timer generates a exclusive execution sequence. To guarantee connectivity, when node n wants to make a decision, n needs to apply appropriate locks on (i) the nodes in other partitions (line 7), and (ii) the nodes in $\mathcal{P}(n)$.

Discussion

Weighted Gateway Assignment

In some scenarios, we may want to optimize for other performance metrics than the number of gateways. For example, it is reasonable to assume that gateway election can be based on node capability, remaining energy level, security level, and stationarity (that the node will not disappear as easily as other nodes). The problem then becomes a node-weighted gateway assignment problem. We believe that the proposed centralized algorithms can be easily extended to support the weighted version of the problem. For example, in each iteration of Cen, instead of selecting a node which requires the minimal number of new gateways (i.e., |X(n)|), we can select a node which optimizes the total weight of the new gateways. Similar extension can be made to the distributed algorithms.

Resilient Gateway Assignment

In general, there is a trade-off between the number of gateways and the resilience of inter-partition connectivity. If there are only a few inter-partition links, then they may be easy to disconnect due to mobility. We can address the problem by provision more redundant links, say, by guaranteeing connectivity across partitions. Developing practical distributed algorithms to guarantee such condition is an interesting research topic, which will be pursued in the future.

Thus, herein we addressed the gateway assignment problem for enabling interoperations among heterogeneous MANETs. We formulated the problem as an optimization problem which assigns minimal number of gateways to support full connectivity among different network partitions, and proved that this problem is NP-complete. We also designed centralized algorithm that guarantees a tight 2-approximation bound and have shown that empirically it performs very close to the optimal solution (within 4% compared to the optimal). We studied two important design choices to develop the distributed versions: (i) level of cooperation (i.e., tightly or loosely cooperative), and (ii) level of shared information (i.e., full or partial topology information). Cooperation across domains is a very important factor in order to obtain good active gateway assignment. The proposed algorithms have been shown to converge to a correct state in finite time and have been shown to work well in medium size inter-domain MANET scenarios.

Appendix

Proof of Theorem 2

Proof: First, note that $|\mathcal{N}_{opt}| \geq |\mathcal{P}|$. Thus, it is sufficient to show that $|\mathcal{N}_{SimpCen}| \leq 2|\mathcal{P}|-2$.

Assume that SimpCen terminates in k steps. At step l, we denote $b_l$ as the number of new nodes that is assigned into $\mathcal{N}$. Also, we denote the number of disjoint components at step l as $Comp(\mathcal{G}_{dm}[\mathcal{N}_l])$. Note that $Comp(\mathcal{G}_{dm}[\mathcal{N}_0]) = |\mathcal{P}|$ and $Comp(\mathcal{G}_{dm}[\mathcal{N}_k]) = 1$. Also note that $k \leq |\mathcal{P}|-1$ because SimpCen assigned $\{n, n'\}$ into $\mathcal{N}$ only if the assignment reduces the number of disjoint components, and there are at most $|\mathcal{P}|$ disjoint components. Then we have the following:

$$|\mathcal{N}_{SimpCen}| = \sum_{l=1}^{k} b_l \leq \sum_{l=1}^{k}(Comp(\mathcal{G}_{dm}[N_{l-1}]) - Comp(\mathcal{G}_{dm}[\mathcal{N}_l]) + 1)$$
$$= Comp(\mathcal{G}_{dm}[\mathcal{N}_0]) - Comp(\mathcal{G}_{dm}[\mathcal{N}_k]) + k \leq 2|\mathcal{P}|-2$$

Proof of Theorem 3

Proof: Consider the following example. There are 3 partitions, Partition A contains $n_1$, Partition B contains $n_2$, $n_3$, Partition C contains $n_4$, $n_5$, and $\{n_1, n_2\}$, $\{n_3, n_5\}$, $\{n_1, n_4\} \in \epsilon$. The optimal solution is $\mathcal{N}_{opt} = \{n_1, n_2, n_4\}$. However, depends on the ordering of edges in $\epsilon$, SimpCen can first select $\{n_1, n_2\}$ then $\{n_3, n_5\}$ since both edges will reduce the number of connected components.

Proof of Theorem 4

Proof: For DIS-Tight to assign node n to become a gateway, n must have W(n)>0. As only one node is allowed to make a decision at each step, assigning node n as gateway implies the assignment will reduce the number of disconnected components in $\mathcal{G}_{dm}[\mathcal{N}_l]$ by at least one. The rest of the proof then becomes similar to the one in Theorem 2 and we omit the details of the proof for brevity.

Proof of Theorem 5

Proof: We first show that DIS-Tight will terminate in finite steps. When node n makes a decision, n executes one of the following actions: (a) selects itself as a gateway in $\mathcal{P}(n)$ and stop the timer, (b) stop the timer because of W(n*)=0 or (c) do nothing (e.g., let the optimal node in $\mathcal{P}(n)$ to assign itself) and wait for next timer expiration. Obviously action (a) and (b) will progressively lead the distributed process to terminate. Node n keeps repeating action (c) until it becomes the best unassigned node in $\mathcal{P}(n)$. Assuming node n ranks $k^{th}$ in $\mathcal{P}(n)$, node n will stop its timer after the first k nodes in $\mathcal{P}(n)$ are selected. As $|\mathcal{P}(n)|$ is finite, the distributed process will terminate in finite steps.

Next we show that the distributed process will terminate at a correct state by contradiction. Assume the process stop at a state where some partitions are not connected. This implies that all timers stop (i.e., the process is terminated) and W(n)>0 for some $n \in \mathcal{V} \setminus \mathcal{N}$. However, this cannot happen because n stops its timer only if W(n)=0 or $n \in \mathcal{N}$.

Proof of Theorem 7

Proof: It is easy to see that $|\mathcal{N}_{DIS-Local}| \leq |\mathcal{P}|(|\mathcal{P}|-1)$. Since each partition establishes a gateway pair with its 1-hop neighboring partitions, there will be at most $$\frac{|\mathcal{P}|(|\mathcal{P}|-1)}{2}$$

such gateway pairs. We omit the details for brevity.

Proof of Lemma 1

Proof: We proved that the performance of Cen is bounded by $2(|\mathcal{P}|-1)$. The remaining details will be easy to construct and we skip that for brevity.

Proof of Theorem 8

Proof: We show this by contradiction. Assume a partition is not connected to its 1-hop neighboring partitions. This implies that DIS-Local disables some gateways, say $\mathcal{N}_{wrong}$, incorrectly such that there are some 1-hop neighboring partitions can only be reached by $\mathcal{N}_{wrong}$. However, this cannot be true because DIS-Local only disables gateways when the 1-hop neighboring partitions are already connected by other gateways in $\mathcal{P}(n)$ (lines 13 and 18).

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
   exchanging routing and connectivity information between a plurality of nodes, each of the plurality of nodes being respectively included in a corresponding one of a plurality of mobile ad hoc networks, the routing and connectivity information excluding global positioning satellite information;

determining, for a given node from among the plurality of nodes, whether a particular set of gateway functionalities of the given node are redundant with respect to one or more other nodes from among the plurality of nodes, based on topology information derived from the routing and connectivity information;

dynamically assigning the given node as a gateway or a non-gateway by respectively turning on or turning off the particular set of gateway functionalities of the given node when the particular set of gateway functionalities of the given node are respectively determined to be non-redundant or redundant with respect to the one or more other nodes; and turning on the particular set of gateway functionalities of inter-partition neighbors of the given node from among the plurality of nodes, when the particular set of gateway functionalities of the given node are determined to be non-redundant resulting in the particular set of gateway functionalities of the given node being turned on.

2. The method of claim 1, wherein said dynamically assigning step is performed by the given node.

3. The method of claim 1, wherein said determining step is performed responsive to a topology change in one or more of the plurality of mobile ad hoc networks.

4. The method of claim 1, wherein the method is performed using a centralized gateway assignment such that at least said determining step is performed by a centralized server with respect to the plurality of mobile ad hoc networks, the centralized server being a non-member to the plurality of mobile ad hoc networks.

5. The method of claim 4, wherein the topology information comprises an intra-domain topology and an inter-domain topology of the plurality of mobile ad hoc networks, the intra-domain topology and the inter-domain topology being known and considered by the centralized server when performing said determining step.

6. The method of claim 5, wherein the routing and connectivity information is stored at the centralized server for deriving the intra-domain topology and the inter-domain topology there from.

7. The method of claim 1, wherein the method is performed using a distributed gateway assignment such that at least said determining step is respectively performed by each of the plurality of nodes.

8. The method of claim 1, further comprising individually enabling each of the plurality of nodes to perform at least said dynamically assigning step.

9. The method of claim 1, wherein the topology information comprises an intra-domain topology and an inter-domain topology of the plurality of mobile ad hoc networks, and said determining step comprises evaluating the intra-domain topology and the inter-domain topology of the plurality of mobile ad hoc networks with respect to one or more criterion.

10. The method of claim 1, wherein the plurality of mobile ad hoc networks are associated with a plurality of domains, the given node is comprised in one of the plurality of domains, and at least one of the one or more other nodes is comprised in a different one of the plurality of domains, and said determining step comprises enforcing a gateway functionality redundancy decision or a gateway functionality non-redundancy decision determined for the at least one of the one or more other nodes that is comprised in the different domain than the given node when rendering a decision for the given node for the determining step.

11. The method of claim 1, wherein the plurality of mobile ad hoc networks are associated with a plurality of domains, the given node is comprised in one of the plurality of domains, and at least one of the one or more other nodes is comprised in a different one of the plurality of domains, and said determining step comprises using as a non-binding reference a gateway functionality redundancy decision or a gateway functionality non-redundancy decision for the at least one of the one or more other nodes that is comprised in the different domain than the given node when rendering a decision for the given node for the determining step.

12. The method of claim 1, wherein the topology information comprises an intra-domain topology and an inter-domain topology of the plurality of mobile ad hoc networks, and said determining step is performed for the given node only when the intra-domain topology and the inter-domain topology are available for use with respect to said determining step.

13. The method of claim 1, wherein each of the plurality of nodes is a respective one of a plurality of mobile wireless devices.

14. A system, comprising:
a first multi-domain mobile ad hoc network comprising a first set of nodes;
a second multi-domain mobile ad hoc network comprising a second set of nodes; and
a centralized server having a dynamic gateway assigner configured to receive routing and connectivity information from a plurality of nodes formed from the first set of nodes and the second set of nodes, and to determine, for a given node from among the plurality of nodes, whether a particular set of gateway functionalities of the given node are redundant with respect to one or more other nodes from among the plurality of nodes, based on topology information derived from the routing and connectivity information,
wherein the given node is configured to dynamically assign itself as a gateway or a non-Gateway by respectively turning on or turning off the particular set of gateway functionalities of the given node when the particular set of gateway functionalities of the given node are respectively determined to be non-redundant or redundant with respect to the one or more other nodes, and
wherein said centralized server turns on the gateway functionalities of inter-partition neighbors of the given node from among the plurality of nodes, when the particular set of gateway functionalities of the given node are determined to be non-redundant resulting in the gateway functionalities of the given node being turned on.

15. The system of claim 14, wherein said dynamic gateway assigner performs a redundancy determination for the particular set of gateway functionalities of the given node responsive to a topology change in one or more of the first multi-domain mobile ad hoc network and the second multi-domain mobile ad hoc network.

16. The system of claim 14, wherein the topology information comprises an intra-domain topology and an inter-domain topology of the first and second mobile ad hoc networks, the intra-domain topology and the inter-domain topology being known and considered by the dynamic gateway assigner when determining whether the particular set of gateway functionalities of the given node are redundant with respect to the one or more other nodes.

17. The system of claim 14, wherein the first multi-domain mobile ad hoc network and the second multi-domain mobile ad hoc network are collectively associated with a plurality of domains, the given node is comprised in one of the plurality of domains, and at least one of the one or more other nodes is comprised in a different one of the plurality of domains, and said dynamic gateway assigner enforces a gateway functionality redundancy decision or a gateway functionality non-redundancy decision determined for the at least one of the one or more other nodes that is comprised in the different domain than the given node when rendering a decision for the given node with respect to determining whether the particular set of gateway functionalities of the given node are redundant with respect to the one or more other nodes.

18. The system of claim 14, wherein the first multi-domain mobile ad hoc network and the second multi-domain mobile ad hoc network are collectively associated with a plurality of domains, the given node is comprised in one of the plurality of domains, and at least one of the one or more other nodes is comprised in a different one of the plurality of domains, and said dynamic gateway assigner uses as a non-binding reference a gateway functionality redundancy decision or a gateway functionality non-redundancy decision for the at least one of the one or more other nodes that is comprised in the different domain than the given node when rendering a decision for the given node with respect to determining whether the particular set of gateway functionalities of the given node are redundant with respect to the one or more other nodes.

19. The system of claim 14, wherein each of the plurality of nodes is a respective one of a plurality of mobile wireless devices.

20. A non-transitory computer readable storage medium comprising a computer readable program, wherein the computer readable program when executed on a computer causes the computer to perform the following:
exchanging routing and connectivity information between a plurality of nodes, each of the plurality of nodes being respectively included in a corresponding one of a plurality of mobile ad hoc networks, the routing and connectivity information excluding global positioning satellite information;
determining, for a given node from among the plurality of nodes, whether a particular set of gateway functionalities of the given node are redundant with respect to one or more other nodes from among the plurality of nodes, based on topology information derived from the routing and connectivity information; and
dynamically assigning the given node as a gateway or a non-gateway by respectively turning on or turning off the particular set of gateway functionalities of the given node when the particular set of gateway functionalities of the given node are respectively determined to be non-redundant or redundant with respect to the one or more other nodes,
wherein the plurality of mobile ad hoc networks are associated with a plurality of domains, the given node is comprised in one of the plurality of domains, and at least one of the one or more other nodes is comprised in a different one of the plurality of domains, and said determining step comprises enforcing a gateway functionality redundancy decision or a gateway functionality non-redundancy decision determined for the at least one of the one or more other nodes that is comprised in the different domain than the given node when rendering a decision for the given node for the determining step.

21. A method, comprising:
exchanging routing and connectivity information between a plurality of nodes, each of the plurality of nodes being respectively included in a corresponding one of a plurality of mobile ad hoc networks, the routing and connectivity information excluding global positioning satellite information, the plurality of mobile ad hoc networks comprising multiple intra-domains and multiple inter-domains;
deriving a real-time intra-domain topology of the multiple intra-domains and a real-time inter-domain topology of the multiple inter-domains from the routing and connectivity information;
determining, for a given node from among the plurality of nodes, whether a particular set of gateway functionalities of the given node are redundant with respect to one or more other nodes from among the plurality of nodes, based on the real-time intra-domain topology of the multiple intra-domains and the real-time inter-domain topology of the multiple inter-domains;
dynamically assigning the given node as a gateway or a non-gateway by respectively turning on or turning off the particular set of gateway functionalities of the given node when the particular set of gateway functionalities of the given node are respectively determined to be non-redundant or redundant with respect to the one or more other nodes; and
turning on the particular set of gateway functionalities of inter-partition neighbors of the given node from among the plurality of nodes, when the particular set of gateway functionalities of the given node are determined to be non-redundant resulting in the particular set of gateway functionalities of the given node being turned on.

22. A non-transitory computer program product comprising a computer readable storage medium including a computer readable program, wherein the computer readable program when executed on a computer causes the computer to perform the method steps as recited in claim 21.

23. The method of claim 21, further comprising individually enabling each of the plurality of nodes to perform at least said dynamically assigning step.

* * * * *